US009420589B2

(12) United States Patent
Basu-Mallick et al.

(10) Patent No.: US 9,420,589 B2
(45) Date of Patent: Aug. 16, 2016

(54) RADIO RESOURCE MANAGEMENT FOR DUAL PRIORITY ACCESS

(71) Applicant: Panasonic Intellectual Property Corporation of America, Torrance, CA (US)

(72) Inventors: Prateek Basu-Mallick, Langen (DE); Genadi Velev, Langen (DE); Takashi Tamura, Osaka (JP); Joachim Loehr, Wiesbaden (DE); Martin Feuersaenger, Bremen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/408,279

(22) PCT Filed: Aug. 1, 2013

(86) PCT No.: PCT/EP2013/066232
§ 371 (c)(1),
(2) Date: Dec. 15, 2014

(87) PCT Pub. No.: WO2014/020128
PCT Pub. Date: Feb. 6, 2014

(65) Prior Publication Data
US 2015/0141030 A1   May 21, 2015

(30) Foreign Application Priority Data

Aug. 3, 2012   (EP) ..................................... 12179278

(51) Int. Cl.
*H04W 72/00* (2009.01)
*H04W 72/04* (2009.01)
(Continued)

(52) U.S. Cl.
CPC ...... *H04W 72/0486* (2013.01); *H04W 28/0289* (2013.01); *H04W 72/10* (2013.01); *H04W 76/066* (2013.01)

(58) Field of Classification Search
CPC ............ H04L 65/4084; H04L 67/325; H04W 72/044; H04W 72/0446
See application file for complete search history.

(56) References Cited

U.S. PATENT DOCUMENTS

2005/0107107 A1   5/2005   Shahidi et al.
2010/0265823 A1*  10/2010  Zhao ..................... H04W 28/12
                                              370/233

(Continued)

FOREIGN PATENT DOCUMENTS

WO        2007/120107 A2    10/2007

OTHER PUBLICATIONS

"3rd Generation Partnership Project; Technical Specification Group Services and System Aspects; Enhancements for Multimedia Priority Service (MPS) (Release 11)," Technical Report, 3 GPP TR 23.854 V11.0.0, Jun. 2011, 41 pages.

(Continued)

*Primary Examiner* — Erin File
(74) *Attorney, Agent, or Firm* — Seed IP Law Group PLLC

(57) ABSTRACT

The present invention relates to performing radio resource management tasks in a communication system including at least a base station and a terminal. In order to avoid inconsistencies in executing the radio resource management tasks for the dual-priority devices, which may run a delay-tolerant and a normal application at the same time, when the device priority changes, the change is indicated to the base station either from the terminal or from the core network. The device priority may be indicated as an overall priority per device or as a priority per bearer configured for the device.

14 Claims, 13 Drawing Sheets

(51) Int. Cl.
*H04W 28/02* (2009.01)
*H04W 76/06* (2009.01)
*H04W 72/10* (2009.01)

(56) References Cited

U.S. PATENT DOCUMENTS

| | | | |
|---|---|---|---|
| 2011/0268026 A1* | 11/2011 | Ronneke | H04W 72/1242 370/328 |
| 2013/0155954 A1* | 6/2013 | Wang | H04W 4/005 370/328 |
| 2013/0237267 A1* | 9/2013 | Lee | H04W 4/005 455/509 |
| 2013/0329560 A1* | 12/2013 | Shomura | H04W 28/0247 370/235 |
| 2014/0022904 A1* | 1/2014 | Ahmad | H04W 28/0289 370/235 |
| 2014/0213264 A1* | 7/2014 | Park | H04W 36/0055 455/438 |
| 2015/0181462 A1* | 6/2015 | Iwai | H04W 28/16 370/229 |
| 2015/0223121 A1* | 8/2015 | Keller | H04W 36/0022 370/331 |

OTHER PUBLICATIONS

"3rd Generation Partnership Project; Technical Specification Group and Systems Aspects; System Improvements for Machine-Type Communications; (Release 11)," Technical Report, 3GPP TR 23.888 V1.5.0, Oct. 2011, 155 pages.

"3rd Generation Partnership Project; Technical Specification Group Services and System Aspects; Service accessibility (Release 10)," Technical Specification, 3GPP TS 22.011 V10.3.0, Mar. 2011, 25 pages.

"3rd Generation Partnership Project; Technical Specification Group Services and System Aspects; Service requirements for Machine-Type Communications (MTC); Stage 1 (Release 11)," Technical Specification, 3GPP TS 22.368 V11.3.0, Sep. 2011, 24 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 10)," Technical Specification, 3GPP TS 23.401 V10.2.1, Jan. 2011, 276 pages.

"3rd Generation Partnership Project; Technical Specification Group Radio Access Network; Evolved Universal Terrestrial Radio Access Network (E-UTRAN); S1 Application Protocol (S1AP) (Release 10)," Technical Specification, 3GPP TS 36.413 V10.0.1, Jan. 2011, 250 pages.

"3rd Generation Partnership Project; Technical Specification Group Radio Access Network; Evolved Universal Terrestrial Radio Access Network (E-UTRAN); S1 Application Protocol (S1AP) (Release 10)," Technical Specification, 3GPP TS 36.413 V10.5.0, Mar. 2012, 255 pages.

Extended European Search Report, dated Feb. 25, 2013, for European Application No. 12179278.2-1854, 11 pages.

Huawei, HiSilicon, "Introduction of EAB in 36.331," R2-123045, 3GPP TSG-RAN WG2 Meeting #78, Prague, Czech Republic, May 21-25, 2012, 15 pages.

International Search Report, mailed Oct. 11, 2013, for International Application No. PCT/EP2013/066232, 6 pages.

NTT DoCoMo, Inc., Huawei, "Prioritised handling of MPS sessions in S1-AP," R3-102263, Agenda Item: 20, 3GPP TSG-RAN WG3 #69, Aug. 23-27, 2010, Madrid, Spain, 2 pages.

"Digital cellular telecommunications system (Phase 2+); Universal Mobile Telecommunications System (UMTS); LTE; Service accessibility (3GPP TS 22.011 version 10.3.0 Release 10)," ETSI TS 122 011 V10.3.0, Apr. 2011, 26 pages.

* cited by examiner

RADIO RESOURCE MANAGEMENT FOR DUAL PRIORITY ACCESS

The invention relates to cellular communication, in particular to the field of network load control including both admission control and congestion control.

TECHNICAL BACKGROUND

The 3$^{rd}$ generation Partnership Project (3GPP) organization specifies the architecture of mobile cellular networks such as like Global System for Mobile Communications (GSM) and Universal Mobile Telecommunications System (UMTS). Third-generation mobile systems (3G), based on WCDMA radio-access technology, such as UMTS, are being deployed on a broad scale all around the world. A first step in enhancing or evolving this technology was the introduction of the High-Speed Downlink Packet Access (HSDPA) and of the enhanced uplink, also referred to as High Speed Uplink Packet Access (HSUPA). In a longer time perspective it is however necessary to be prepared for further increasing user demands and be competitive against new radio access technologies. To meet this challenge, 3GPP has initiated a study item leading to Evolved 3GPP Packet Switched Domain, which is also known under the name Evolved Packet System (EPS). The EPS combines an Evolved Packet Core (EPC) network that is able to connect a new generation of an access network technology called Evolved Universal Terrestrial Radio Access Network (E-UTRAN) as well as the pre-successor of the E-UTRAN called Universal Terrestrial Radio Access Network (UTRAN). Another broadly used term for E-UTRAN (and having the same meaning) is Long Term Evolution (LTE). LTE is designed to meet the subscriber and network operator needs for high speed data and media transport as well as high capacity voice support to the next decade. A more detailed description of the EPS can be found in 3*GPP Technical Specification (TS) 23.401; "General Packet Radio Service (GPRS) enhancements for Evolved Universal Terrestrial Radio Access Network (E-UTRAN) access"*; v. 10.2.1 of January 2011, freely available through www.3gpp.org and incorporated herein by reference.

An LTE network architecture including network entities and interfaces between them is exemplified in FIG. 1. As can be seen in FIG. 1, the LTE architecture supports interconnection of different radio access networks (RAN) such as UTRAN or GERAN (GSM EDGE Radio Access Network), which are connected to the EPC via the Serving GPRS Support Node (SGSN). Some of the entities and interfaces are described below for facilitating the understanding of the exemplary embodiments of the present invention.

In a 3GPP mobile network, the mobile terminal 110 (called User Equipment, UE, or device) is attached to the access network via the Node B 120 (NB) in the UTRAN and via the evolved Node B (eNB) in the E-UTRAN access. The NB and eNB 120 entities are known as base station in other mobile networks. The NBs and eNBs 120 in UMTS and LTE also fulfil the functions of a base station, i.e. provide a wireless access interface for cellular wireless terminals. There are two data packet gateways located in the EPS for supporting the UE mobility—Serving Gateway (SGW) 130 and Packet Data Network Gateway 160 (PDN-GW or shortly PGW). The SGW terminates the interface towards the radio access networks, e.g. the UTRAN or the E-UTRAN. The mobility within one radio access network (UTRAN or E-UTRAN) is access specific. The mobility within the EPC is managed by the PGW. The mobility management in the EPC between the PGW and the SGWs can be based either on the Proxy MIPv6 (PMIP) protocol or on the GPRS Tunneling Protocol (GTP). The interface between the SGW and the PGW is called S5 and it can be based either on the GTP or the PMIPv6 protocol. The PGW further performs IP address allocation to the UE and packet filtering (e.g. deep packet inspection, packet screening) in order to map the UE's traffic to appropriate Quality of Service (QoS) level.

Assuming the E-UTRAN access, the eNB entity 120 may be connected through wired lines to one or more SGWs via the 51-U interface ("U" stays for "user plane") and to the Mobility Management Entity 140 (MME) via the S1-MME interface. The 51-U interface is based on the GTP protocol and the S1-MME interface is based on the S1-AP protocol. The latter is specified in 3*GPP Technical Specification (TS)* 36.413; "*S1 Application Protocol (S1AP)*"; v. 10.0.1, January 2011, freely available through www.3gpp.org and incorporated herein by reference.

The SGSN 150 and MME 140 are also referred to as serving core network (CN) nodes. These network nodes maintain the context of the UE in the network, which means the security parameters, parameters used for the mobility management (e.g. in which are or cells the UE is camping, if the UE is reachable) and parameters used for the session management (SM) such as QoS parameters describing the communication sessions.

The SGW 130 routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME 140 is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME 140 is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME 140 from the SGSN 150. The MME also terminates the S6a interface towards the Home Subscriber Server (HSS) for roaming user equipments.

The E-UTRAN comprises eNodeBs, providing the E-UTRA user plane by means of Packet Data Control Protocol (PDCP), Radio Link Control (RLC), Medium Access Control (MAC) and physical layer protocols (PHY) as well as control plane by means of Radio ResourceControl (RRC) protocol terminations towards the UE. The eNodeB (eNB) hosts the PHY, MAC, RLC and PDCP layers including the functionality of user-plane header-compression and encryption. The service the RLC layer provides in the control plane between UE and eNodeB is called Signaling Radio Bearer (SRB). In the user plane, the service provided by RLC layer between the UE and the eNodeB is called a Radio Bearer (RB) or Data Radio Bearer (DRB). The eNB also offers RRC functionality corresponding to the control plane. It performs many functions including radio resource management, admission control, scheduling, enforcement of negotiated uplink QoS, cell information broadcast, ciphering/deciphering of user and control plane data, and compression/decompression of downlink/uplink user plane packet headers. The eNodeBs are interconnected with each other by means of the X2 interface.

Amongst others, higher layer, i.e. Non Access Stratum (NAS), messages are carried by the RRC messages (e.g. using RRC Direct Information Transfer message) between the UE and the eNodeB. The Non Access Stratum is a functional layer running between the UE and the Core Network (CN) and located above the RRC. Furthermore, the NAS is the functional grouping of protocols aimed at Call Control (CC) for circuit switched voice and data, at Session Management (SM) for packet switched data and Mobility Management (MM) and at Short Message Services (SMS) for packet switched and circuit switched domains. The control messages the NAS layer generates are called NAS messages. Such messages are for example used to control Mobility Management, Session Management, SMS Transport and Call Management. NAS messages are transported transparently through the Access Stratum layers (layers 3-2-1, RRC, PDCP, RLC, MAC, PHY) that include the function and protocols to support the NAS transport. In order to send the initial non-access stratum message, the user equipment first establishes a Radio Resource Control (RRC) connection to the eNodeB over the air interface (Uu interface). During the RRC connection establishment the user equipment and eNodeB get synchronized and establish the Signaling Radio Bearers (SRB) that can be used for the transport of the non-access stratum messages.

The Access Stratum is the functional grouping of protocols specific to the access technique, in this case, the RRC, PDCP, RLC, MAC and PHY. It includes protocols for supporting transfer of radio-related information, for coordinating the use of radio resources between UE and access network, and for supporting access from the serving network to the resources provided by the access network. The Access Stratum offers services through Service Access Points (SAP) to the Non-Access Stratum (CN-related signaling and services), i.e. provides the Access Link between UE and core network, which consists of one or more independent and simultaneous UE-core network radio access bearer services, and only one signaling connection between the upper layer entities of UE and the core network.

When the UE is switched-off or not attached to the mobile network, the UE is in DEREGISTERED state. In DEREGISTERED state, no EPS Mobility Management (EMM) context exists and the UE location is unknown to an MME and hence it is unreachable by an MME.

When a mobile terminal (or user equipment, UE) is attached to the network, the UE is in the so called REGISTERED state, i.e. EPS Mobility Management context has been established and a default EPS bearer context has been activated in the network and in the UE. When the UE is REGISTERED to mobile network, the UE can be in two different connections management states: IDLE and CONNECTED state.

The UE is in IDLE state when there is no data for transmission and the radio resources are released, but the UE still has a valid IP configuration. A UE in IDLE state does not have a radio association (i.e. Radio Resource Control Connection, RRC) with the eNB, and therefore, there are no established signaling and data radio bearers. Further, there is no Non-Access Stratum (NAS) signaling connection between the UE and the network (e.g. to the MME) and also, there is no S1-U connection between the eNB and the SGW.

When the UE is in CONNECTED state and the network (usually the eNB) detects that the UE is not sending/receiving data for a certain period of time, the network (usually the eNB) decides to release the radio resources and the S1 connection. As a result, the UE transits from CONNECTED to IDLE state. Also the MME changes its internal state for the UE to IDLE and informs the SGW to release the S1-U connection to the eNB.

When the UE is in the IDLE state and uplink or downlink data or signaling (NAS signaling, e.g. due to the TAU procedure) needs to be exchanged between the UE and the network, the UE and the MME shall enter the CONNECTED state. In order to do it, the UE firstly needs to establish a Radio Resource Control (RRC) connection to the eNB over the Uu interface. During the RRC connection establishment the UE 110 and the eNB 120 get synchronized and establish the Signaling Radio Bearers (SRB) that can be used for the transport of the NAS messages. The RRC layer is a part of the so called Access Stratum (AS) including additionally the PDCP, RLC, MAC and Physical layers.

The above described IDLE and CONNECTED states are related to a NAS layer state diagram. On the other hand, in the AS layer the IDLE and CONNECTED states are also defined. The AS IDLE and CONNECTED states are similar but not completely analogical to NAS IDLE and CONNECTED states, i.e. if the RRC connection is established, the AS state is CONNECTED, otherwise if the RRC connection is released, the AS state is IDLE. Not always when the AS state is CONNECTED, the NAS state is also CONNECTED (e.g. for TAU procedure without active flag). The establishment of the RRC connection, and thus, the transition to AS CONNECTED state, is initiated by the UE, as only the UE can send "RRCConnectionRequest" message. The UE initiates the RRC connections establishment either due to the availability of uplink data or uplink signaling; or due to paging from the network in order to receive downlink data or downlink signaling.

For instance, when the UE has uplink data or uplink NAS signaling to send, the UE initiates the NAS Service Request procedure (described in 3GPP TS 23.401 cited above). The UE generates a "Service Request" message and triggers the AS to establish a corresponding RRC connection. The RRC establishment cause sent to the eNB in the "RRC Connection Request" message is set to "mo-Data" (mobile-originating data, meaning that the UE would like to send uplink data), "mo-Signaling" (mobile-originating signaling, meaning the UE would like to send uplink signaling) or to a special value "delay tolerant access" which is used when the application that triggered the session (connection) establishment is a delay tolerant application.

On the other hand, when the network (core network) has downlink data or downlink NAS signaling for the UE, the network initiates the Paging procedure.

Recently, 3GPP has started an activity on Network Improvements for Machine Type Communication (MTC). The service requirements have been described in 3*GPP TS* 22.368, v.11.3.0, October 2011, *"Service requirements for Machine-Type Communications (MTC)"*, freely available on www.3gpp.org, while the study of possible architecture solutions can be found in 3*GPP TS* 23.888, v.1.5.0, October 2011, "*System Improvements for Machine-Type Communications (MTC)*", freely available on www.3gpp.org. The MTC terminals or MTC devices are characterized in that they are usually not operated by a human being. Rather, the communication peer is another machine such as a so called MTC server or another MTC terminal(s). As the MTC devices can be also mobile terminals as specified by the 3GPP, a more general notification like "UE" is also used throughout this description, so that the MTC device, terminal or UE are used interchangeable.

The MTC has some particular features which differ from the usual human-to-human communication. 3GPP tries to identify these particular features in order to optimize the network operations. These specifics are called "MTC features". For instance, an MTC device typically sends or receives smaller amounts of data. Another feature of the MTC devices and 3GPP core network (CN) shall be the ability to allow an external server (MTC server) to trigger the MTC device to initiate a communication with the MTC server. This is enabled by a so-called "device triggering". The Device Triggering is initiated by the MTC server and can be performed by different means.

The MTC devices could be a source of congestion/overload in the network. Thus, an efficient radio resource management (RRM) is necessary for the network, and in particular for the radio access network. As described above, when terminals (UEs) request a service from the network, they generate a rather high amount of signaling. If the amount of terminals is high as it is in the case of MTC devices (cf. TS 23.401 cited above, Section 4.3.17.2, "Overview of protection from Potential MTC Related Overload"), the network could be overloaded (congested) rather quickly before an appropriate admission (access) control could be applied.

The overload may occur since the total amount of signaling from a large number of terminals is a concern (is likely) in at least the two following exemplary situations:
  when an application (running in many UEs) requests the many UEs to do "something" at the same time; and/or
  when many UEs are roamers, if their serving network fails, then they shall likely all try to move into the local competing networks. This may potentially overload the not (yet) failed network(s).

In general, in Release 10 (Rel-10) of the 3GPP standardization the congestion control mechanism in the network was extended with the NAS level congestion control. The introduction of NAS level congestion control was a result of the studies performed in 3GPP for the impact of Machine Type Communication to the network. It was concluded that the numerous MTC devices acting in simultaneous manner could cause congestion or overload to the network. To counter such overloads, 3GPP has specified several measures including:
  a) Where applicable, UEs can be configured for enhancements as described in subsequent points; a post-manufacturing configuration can be performed remotely.
  b) For mobile originated services, UEs configured for low access priority provide the E-UTRAN with information indicating that the RRC connection establishment is from a UE configured for low access priority when they establish connection to the E-UTRAN.
  c) RRC signaling has the capability of providing 'extended wait timers' when rejecting messages from UEs configured for low access priority.
  d) The MME can initiate rejection of RRC connection establishments in the E-UTRAN for certain subcategories of UEs. In addition, MME signaling or operation an management (O&M) signaling can trigger E-UTRAN to initiate Extended Access Barring for certain subcategories of UEs.
  e) Overload messages from the MME to E-UTRAN are extended to aid the E-UTRAN in performing the functionality in the above points b), c) and d).
  f) UEs configured with a long minimum periodic PLMN search time limit (cf. 3GPP TS 24.368 cited above) have an increased minimum times in between their searches for more preferred PLMNs.

The NAS level Mobility Management control is applicable when many UEs initiate network access attempts almost simultaneously which could cause a congestion in the serving CN node (MME/SGSN).

Both Session Management (SM) and Mobility Management (MM) are considered as sublayers of the NAS (Non-Access Stratum) layer in the UE and in the MME/SGSN. Usually the MME/SGSN and UE store separate MM and SM contexts. Furthermore, the SM context is per PDP (Packet Data Protocol) or PDN (Packet Data Network) connection.

A dual-priority device is a device that is capable of running (executing) a low-priority application (a delay-tolerant application), a normal-priority application or both types of application simultaneously.

The dual-priority devices may thus alternatively or simultaneously execute applications with different priorities, i.e. may access service with a delay-tolerant characteristics (for instance an MTC application) or a normal service (for instance a telephony, streaming or internet access). The application and thus also the requirements of the service (and its priority) may change also during the connection. However, the radio access network and in particular the base station is only informed about the device priority at the time of the initial network access. Accordingly, the base station cannot appropriately perform the radio resource management tasks such as congestion or access (admission) control. The inconsistency between the real device priority of the terminal and the device priority relayed to by the base station may lead to wrong decisions in the situation of congestion. For instance, the base station may decide to release radio resources of a normal-priority terminal when the terminal initially accessed the network executing a low-priority MTC-application. Or, on the other hand, the base station may decide to allocate resources to a low-priority terminal when the terminal initially accessed the network executing a normal-terminal application.

SUMMARY OF THE INVENTION

There are at least two kinds of devices from the application delay tolerance, i.e. priority perspective: delay-tolerant and non-delay-tolerant. The same device may also run applications, some of which are delay-tolerant whereas the others are not (called also "normal applications" in the following). These devices are called dual priority devices or terminals or UEs. The problem underlying the present invention is based on the observation that for the dual-priority devices, the radio resource management functions may be performed incorrectly since the base station may employ information inconsistent with the status of the terminal connection The aim of the present invention is to improve the radio resource management handling so that the terminal, the radio access network and the core network operate consistently.

This is achieved by the features of the independent claims.

Advantageous embodiments are subject matter of the dependent claims.

The particular approach of the present invention is to enable the base station to perform correct decisions regarding controlling of the of the overload situation. In order to enable the base station to make the overload control decisions efficiently, the base station obtains information about the priority or a change of the priority relating to the terminal from the core network (for instance mobility management entity) or from the terminal.

The present invention allows the radio network to efficiently perform the radio resource management functions by enabling controlling the network overload correctly. The overload may arise in the core network or in the radio network. The present invention allows the network to avoid taking resource away from a normal priority UE at the time of congestion and also enables that the radio resources are not allocated to a low priority UE at the time of congestion.

According to an aspect of the present invention, a method being for execution in the base station is provided for performing radio resource management in a communications system including a base station and a terminal. The method comprises the steps of: receiving from a mobility management node serving the terminal an indicator of a priority, the priority being related to the terminal and indicating whether or not a traffic of the terminal is delay-tolerant, and performing radio resource management tasks including congestion or admission control based on the received indicator.

According to another aspect of the present invention, a method being for execution in the base station is provided for performing radio resource management in a communications system including a base station and a terminal. The method comprises the steps of: receiving from the terminal an indicator of a new priority or an indicator of priority per bearer, the priority being related to the terminal and indicating whether or not a traffic of the terminal is delay-tolerant, and performing radio resource management tasks including congestion or admission control based on the received indicator.

The step of performing radio management tasks of the above methods preferably includes, when the communication system is congested the steps of: removing bearers carrying terminal traffic and/or the corresponding RRC connection when the corresponding received indicators indicate a delay-tolerant priority, and deciding in accordance with the congestion status whether to remove or not to remove bearers carrying terminal traffic and/or the corresponding RRC connection when the corresponding received indicators do not indicate a delay-tolerant priority.

The deciding step may be configured also automatically not to remove the bearers with the normal priority.

In accordance with another aspect of the present invention, a method for being performed at a network node is provided for performing radio resource management in a communications system including a base station and a terminal. The method comprises the steps of: determining a priority being related to the terminal and indicating whether or not a traffic of the terminal is delay-tolerant, and transmitting to the base station an indicator of the determined priority so as to enable the base station to perform radio resource management tasks including congestion or admission control based on the priority.

Preferably, the indicator is included in a message of the S1-AP protocol from the mobility management node serving the terminal to the base station.

For instance, the S1-AP message is at least one of the Initial Context Setup Request, E-RAB Setup Request and E-RAB Modify Request. However, the present invention is not limited thereto and the S1-AP message may be a new message, meaning a message specified to carry the priority or a new priority. It is noted that the base station may also be informed about the change of the priority by setting a change flag in an message transmitted either from the network node or from the terminal.

The S1-AP message such as Context Setup Request, E-RAB Setup Request or E-RAB Modify Request may include an information element carrying allocation/retention priority for scheduling purposes, the information element being configured to take a value from a predefined range of values. Advantageously, values of the priority indicating whether or not a traffic of the terminal is delay-tolerant are mapped to said predefined range of values in such manner that one or more of the values from the predefined range indicate that the terminal traffic is delay-tolerant and another one or more of the values from the predefined range indicate that the terminal traffic is not delay-tolerant.

For instance, the mapping is configured by the base station or the mobility management node serving the terminal, and the base station or the mobility management node serving the terminal transmits the configured mapping to the mobility management node serving the terminal or to the base station, respectively.

In accordance with still another aspect of the present invention, a method for execution in the terminal is provided for performing radio resource management in a communications system including a base station and a terminal. The method includes the steps of: establishing a priority related to the respective terminal bearers and indicating whether or not a traffic of the bearers is delay-tolerant, and transmitting to the base station an indicator of the priority so as to enable the base station to perform radio resource management tasks including congestion or admission control based on the priority.

In accordance with another aspect of the present invention, a method for execution in the terminal is provided for performing radio resource management in a communications system including a base station and a terminal. The method includes the steps of: establishing a new priority related to the terminal after a change of the priority and indicating whether or not a traffic of the terminal is delay-tolerant, and transmitting to the base station an indicator of the priority so as to enable the base station to perform radio resource management tasks including congestion or admission control based on the priority.

Preferably, the priority of the terminal traffic changes, the method further comprises a step of generating a radio resource control, RRC, protocol message in which the indicator is transmitted. However, the present invention is not limited thereto and another RRC message or a newly specified RRC message or other message may be employed.

For instance, the RRC protocol message is either the RRC Connection Request or the RRC Connection Reestablishment.

Advantageously, the indicator is transmitted when the priority related to the terminal and indicating whether or not traffic of the terminal is delay-tolerant is changed from a value known to the base station to a new value. Preferably, the priority value depends on the content of USIM of the terminal and/or on the bearer characteristics regarding Quality of Service, QoS, of the terminal.

For instance, the indicator indicates a device priority which is the overall priority of the terminal including all configured bearers, the overall priority of the terminal being a maximum of the priorities of the terminal's configured bearers. Alternatively, the indicator indicates the device priority per bearer.

In accordance with an aspect of the present invention, a base station is provided, which is capable of performing radio resource management in a communications system including the base station and a terminal, the base station comprising: a receiving unit for receiving from a mobility management node serving the terminal an indicator of a priority or from the terminal an indicator of a new priority or a priority for particular bearers, the priority being related to the terminal and indicating whether or not a traffic of the terminal is delay-tolerant, and a radio resource manager for performing radio resource management tasks including congestion or admission control based on the received indicator.

In accordance with an aspect of the present invention, a network node is provided in a communications system including the network node, a base station and the terminal, the network node including: a priority determining unit for determining a priority being related to the terminal and indicating whether or not a traffic of the terminal is delay-tolerant, and a transmitting unit for transmitting to the base station an indicator of the determined priority so as to enable the base station to perform radio resource management tasks including congestion or admission control based on the priority.

In accordance with an aspect of the present invention, a terminal is provided for being operated in a communications system including the terminal and a base station, the terminal comprising: a priority determining unit for establishing a priority related to the terminal and indicating whether or not a traffic of the terminal is delay-tolerant, and a transmitting unit for transmitting to the base station an indicator of the priority so as to enable the base station to perform radio resource management tasks including congestion or admission control based on the priority.

The overload situation or scenario is the situation in which congestion and/or admission control has to be performed since the network does not provide enough resources for all entities communicating. The overload control in this context relates to deciding whether an entity, such a terminal or a base station, is enabled to establish connection (admission control) or get resources for the communication. The overload can occur in the core network or in the radio access network.

The purpose of this priority is to distinguish, for instance, the MTC devices (terminals) from the other terminals (normal device). This distinguishing assumes that typically the MTC terminals transmit delay tolerant traffic for which immediate delivery is not necessary. On the other hand, other types of terminal are usually capable of transmitting and receiving a delay-critical services, such as telephoning or streaming, which may include transmission of speech or any audio and/or video streams.

In accordance with another aspect of the present invention, a computer program product comprising a computer-readable medium having a computer-readable program code embodied thereon is provided, the program code being adapted to carry out the present invention.

In accordance with still another aspect of the invention an integrated circuit is provided embodying any apparatus as described above.

The above and other objects and features of the present invention will become more apparent from the following description and preferred embodiments given in conjunction with the accompanying drawings in which.

DETAILED DESCRIPTION

Figure 1:
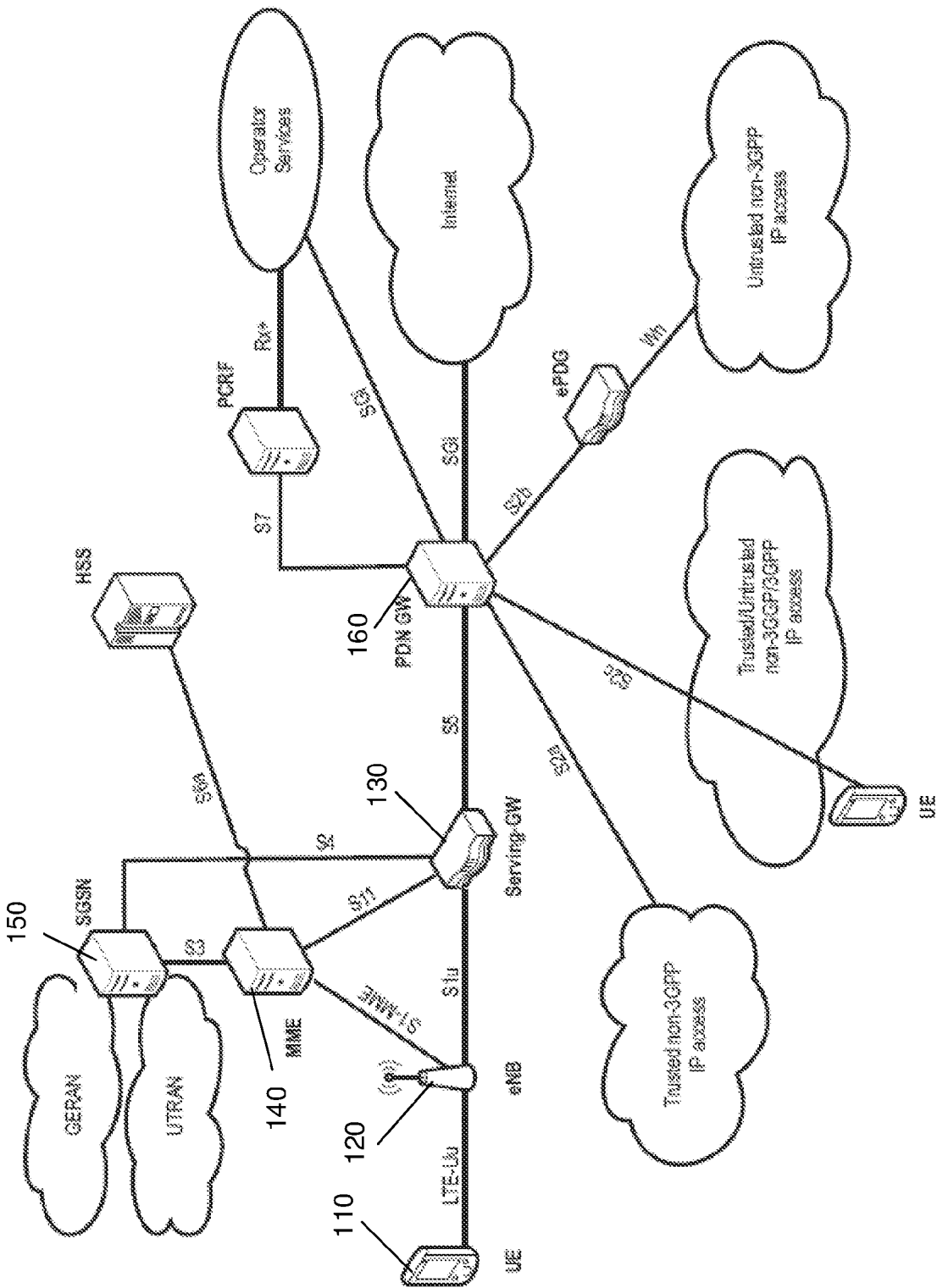
FIG. 1 is a block diagram illustrating current 3GPP architecture for machine-type communication.

As summarized in the background section, the dual-priority devices (terminals) may change their device priority during the network connection. This case may lead to inconsistencies of the priority assigned to the device and known to the core network and between the priority known to the radio access network.

In order to overcome this problem, in accordance with an embodiment of the present invention, either the core network (for instance, the MME) or the terminal indicates to the radio access network (for instance the base station serving the terminal, in LTE the eNB) the changed device priority. Accordingly, the base station may take appropriate radio resource management decision in the case of network congestion.

Further problems arise from the fact that the device priority valid and signaled at the initial access is an "overall" device priority without distinguishing between the applications executed by the terminal, and thus without distinguishing between the requirements on the network services for the respective applications, and thus also without distinguishing the "device priority" of the respective bearers for carrying the communication of the applications. In particular the dual-priority devices executing simultaneously a low-priority application (delay-tolerant application) and a normal-priority application may be inappropriately handled by the radio resource management performed by the base station. In other words, from the network's perspective the device priority is "per UE"; i.e. the radio network considers a UE as either a low-priority or a normal-priority UE depending on how it accessed the network. The way of accessing is given by the establishment cause value signaled in the RRC Connection Request. This means that the decision to retain or to release the UE is taken as whole for the entire UE's RRC connection.

In order to solve this problem, an embodiment of the present invention provides a possibility of releasing only the bearers for low priority application rather than releasing the entire network connection as will be described in detail below.

The distinguishing between the priority of the device ("device priority") and in particular distinguishing between the delay-tolerant and other ("normal") terminals and/or bearers of a terminal is important in order to provide the radio access network with a basis for deciding which terminals or applications of a terminal shall be assigned resources or admitted to access in the congestion situation, i.e. in a situation when there are more resources requested than resources available.

The device priority (in the following, the term "device priority" shall be used also for the cases when the device priority is bearer-specific) depends in general on the application running (being executed) and/or on the configuration of the Universal Subscriber Identification Module (USIM). A USIM is, as well as SIM, an integrated circuit embedded into a removable SIM card, which can be transferred between different mobile devices. The SIM card contains its unique serial number (ICCID), international mobile subscriber identity (IMSI), security authentication and ciphering information, temporary information related to the local network, a list of the services the user has access to and two passwords: a personal identification number (PIN) for ordinary use and a personal unblocking code (PUK) for PIN unlocking. The difference between SIM (employed for GSM and GPRS) and USIM is that the USIM has been introduced for UMTS and involves some security improvements such as the mutual authentication, longer encryption keys, and an improved address book.

In the congestion situation (when the network is congested), the low priority terminals are subject to various access-barring restrictions and may be the first ones among the terminals to be moved from the CONNECTED state to the IDLE state. Accordingly, when there is an inconsistency between the priority known by the base station and the real priority of the terminal—which is a normal-priority after a change—the normal-priority application may suffer from congestion control measures decided by the base station.

In this document, the term such as "network node" designates a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

The term "server" or "triggering server" here refers to an entity which may be within the network or in an external network or an external node. It may be, for instance a server for automatically collecting data from a (MTC) terminal or a plurality of terminals and capable of sending to the terminal triggering requests. A triggering request is a message or an indicator communicated to the terminal and indicating that the terminal should set-up a connection to the network and/or to the server in order to provide it with data such as measured data, the data to be transmitted to the server or just signaling data for indicating its identity or for indicating that the actual data will be, will not be sent or will be send with a delay—as provided by the present invention. It is noted that the server may also be implemented by another terminal. For instance, a first terminal may be configured to trigger a second terminal. Such a configuration may be advantageous, for instance, when a (possibly user operated) terminal collects data from another MTC terminal. As described in the background section above, the terminal may be an LTE, UMTS, or GSM/GPRS/EDGE terminal.

Small amount of data which is typically provided by an MTC terminal may be understood as a small chunk of data, which could be a small IP packet, an SMS or some other application specific data. The amount of data may be considered to be small enough, for instance, when it fits into an SMS. Accordingly, the small data amount could be smaller than 140 bytes, which is the current payload size of an SMS.

Regarding the distinguishing between the user plane and the control plane, data bearers are associated with and part of the user plane. They are established to transport user data. In contrast, the control plane and signaling bearers are, in general, for the transport of the control signaling.

The base station may have knowledge of the terminal's initial access priority based on the RRC connection establishment message and in particular by looking at the "establishment cause". The establishment cause is an indicator (an information element, i.e. a sytax element of the corresponding protocol, in this case the RRC protocol) which can indicate, for instance, a "delay-tolerant access", which may correspond to the delay tolerant device priority. Based on this indication, the base station may assume that the terminal is an MTC terminal. Otherwise, when the establishment cause is not "delay tolerant access", the base station may assume that the terminal is a normal terminal, for instance, a no-MTC terminal. However, later during the UE connection, the device priority of the terminal (the terminal's access priority) may change. Accordingly, the present invention envisages signaling the changed device priority from the terminal to the base station. Alternatively or in addition, the device priority and/or its change, may be signaled from the MME to the base station.

Any UE could be configured as a delay tolerant device. A delay tolerant UE is the one running a delay tolerant application/service/bearer. The priority of the UE that is available from the Initial Connection Establishment ('Establishment cause' in RRC Connection Request). If during RRC Connection the UE indicated that it is delay tolerant then the network might reject the Connection Request if there was congestion on the network side. A delay-tolerant UE should maintain some special System information while in IDLE mode. Such information is, for instance, System Information Block Type 14 in LTE, to be incorporated in Section 5.2.2.3 of the RRC protocol specification 3GPP TS 36.331 by 3GPP RAN2 CR # R2-123045, available freely via www.3gpp.org. These (delay-tolerant) UEs can only try to access the network (initiate RRC Connection Establishment) if they are not barred from doing so as indicated by the special System information for the particular UE's access class. The UE NAS informs UE RRC as to when it is configured for delay tolerant Access.

According to an embodiment of the invention, the UE NAS also indicates to UE RRC when it is no more configured for delay-tolerant access (this may be the case when the USIM configuration has changed or when some changes on the bearer context maintained in NAS suggest that it is no more configured for delay-tolerant access). Upon receiving the indication the UE stops to maintain the special System Information until further notice (the further notice may follow if delay-tolerant configuration applies again) from the UE NAS. This behavior enables saving terminal battery since it no longer needs to un-necessarily maintain the special SIB (system information block). The UE NAS is the functional part of the terminal which communicates with the core network over NAS protocol stack, i.e. transparently to the eNB. The UE RRC is the functional part of the terminal which communicates with the radio access network, i.e. with the eNB over the RAN protocol stack including RRC protocol.

This approach is particularly relevant for so-called dual priority devices, which may run a low priority application, a normal priority application or both types simultaneously. For instance, a mobile phone may be a usual mobile phone and in addition may implement an MTC functionality. The change of the device priority may be caused, for instance, by a new application running on the terminal.

It is noted that MTC application may but need not be delay-tolerant (i.e. low-priority). The MTC devices would generally likely be running delay-tolerant applications but this is not necessarily always the case even when in the following, some MTC-related examples are provided. On the other hand, the normal terminals may be configured for running delay-tolerant applications.

It is noted that the LTE standard, for instance, defines a so-called allocation and retention priority (ARP) which is, however, used for different purposes. In particular, the allocation and retention priority is an information element of the S1-AP protocol having a predefined range of values, the meaning of which is configurable by the mobile operator and which aims at providing additional information for the scheduler. The allocation and retention priority differs from the above defined device priority, in that it does not characterize the device with respect to its delay tolerance and it is not used for the radio resource management functions, such as congestion control and admission control.

The device priority is given by the applications running on the terminal and/or on the USIM configuration. For instance, the device priority may be defined by the quality of service (QoS) characteristics of the bearers configured for the terminal. Regarding the USIM configuration, it may specify whether the terminal is an MTC or a normal terminal. The low priority terminals are subject to different access barring restrictions and may be the first ones to be removed to from the CONNECTED state to the IDLE state when the network is congested.

The priority of the terminal may be configured and reconfigured by changing the USIM and in particular the following four parameters also called management objects:

NAS_SignalingPriority
ExtendedAccessBarring
Override_NAS_SignalingLowPriority
Override_ExtendedAccessBarring These four parameters or a subset thereof and/or the application type may affect (influence) the priority of the terminal. This priority is conveyed at the NAS level to the MME upon initial set-up and/or upon further modifications. The priority is preferably conveyed within an information element relating to the UE properties. However, it may also be carried by information element(s) regarding the properties of the bearers configured for the device.

In terms of the LTE system, the problems of the current state in standardization are summarized below. If a terminal has initiated RRC connection due to a low priority access as indicated by non-access stratum (NAS), and, at a later stage, if an application triggers bearer set up for a normal priority access in the same RRC connection, the radio access network (base station) would not get any update of the situation, i.e. any priority change indication. This may result in releasing the RRC connection when there is congestion in the network, even when a normal priority application was running in the terminal. Similarly, if the terminal initiated in RRC connection due to a normal priority access indicated by NAS, and, later, if an application triggers a bearer set up for a low priority access in the same RRC connection, the radio access network has no information about this priority change. This may lead to not releasing the RRC connection in the case of congestion in the radio access network, even if no normal priority application is currently running. This is contrary to the original intention of defining low priority terminals in such a manner that the RRC connection of low priority devices could be released if required without negatively affecting the application.

One solution to this problem could be that upon initiation of a new application (or upon PDN connection modification due to an old bearer) which results in change of priority, a terminal can trigger a release of an RRC connection autonomously and afterwards further establish a new RRC connection with a normal (not delay-tolerant) priority access.

However, in LTE, the autonomous release from the terminal is not a specified procedure except for "RRC connection release requested by upper layers", which leads to treating the current cell as barred. Even if the terminal did not treat the current cell as barred, for instance, due to a new release caused from the NAS, the autonomous release of RRC connection is a means likely to be avoided by 3GPP based on the experience with UMTS, where the terminal implementations could trigger release of RRC connection only in order to save some power. Moreover, RRC connection release and immediate subsequent RRC connection establishment may create confusion in the network regarding old and new context creation of the terminal. If the subsequent connection establishment is not immediate, this could then incur some delay and signaling overhead in the call establishment, which is a disadvantage especially for the normal bearer.

In accordance with the present invention, the terminal non-access stratum should determine the new priority of the device based on the application type of the new application triggering a session management signaling to establish a new PDN connection, based on the USIM information, such as whether or not the overriding leaves are configured, and/or based on the device current priority level. The determined priority is then signaled to the base station either from the terminal or from the MME. The MME has a knowledge of the priority since it receives this priority from the UE.

Figure 2:
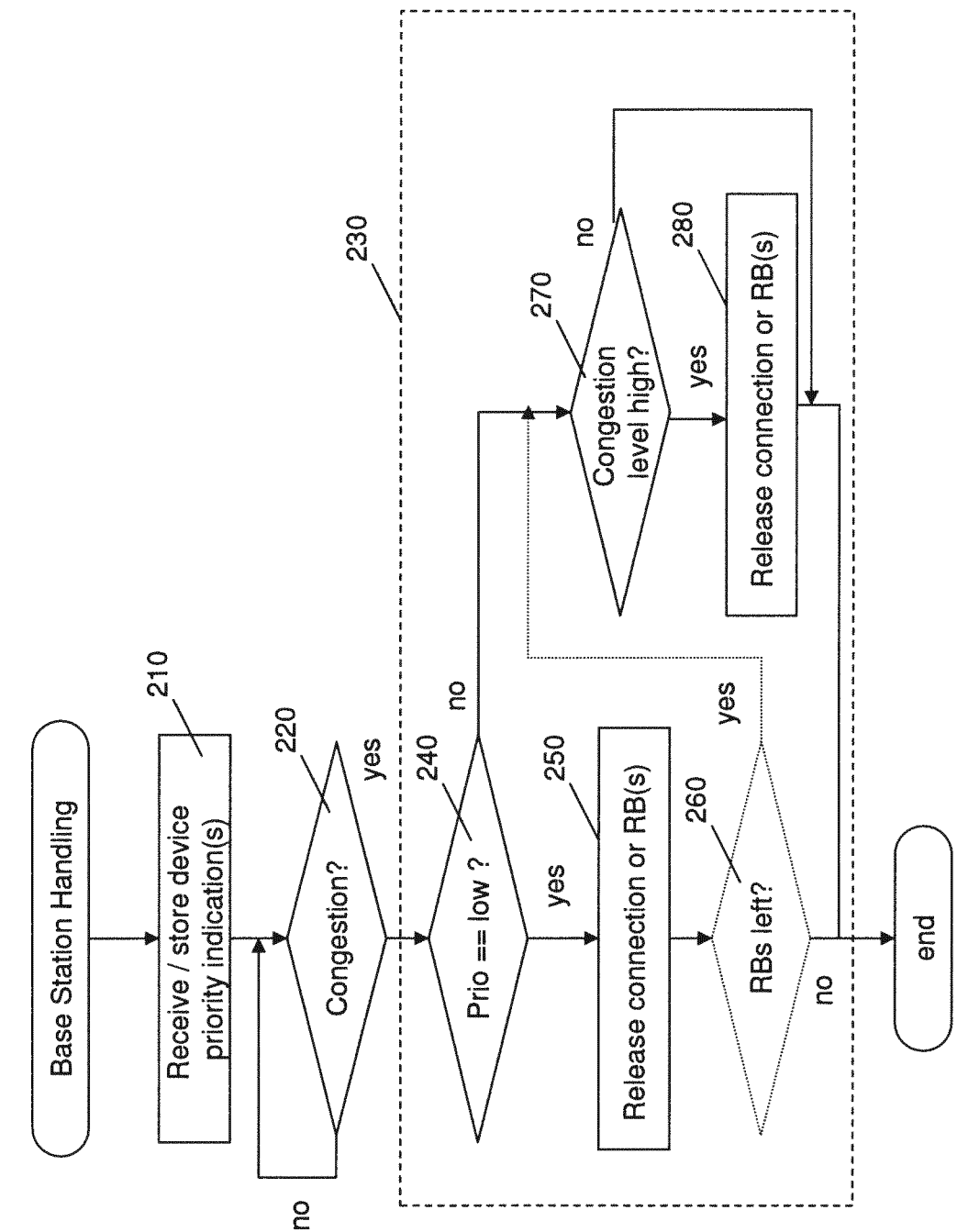
FIG. 2 is a flow diagram illustrating an exemplary handling of a base station in accordance with an embodiment of the present invention.

The handling of congestion by a base station according to an embodiment of the invention is shown in FIG. 2.

In particular, FIG. 2 is a flow chart illustrating a method for being executed in the base station. The method enables performing the radio resource management tasks including congestion or admission control in a communications system including the base station, a network node such as a mobility management node serving the terminal, and a terminal. The method includes a step 210 of receiving from the mobility management node serving the terminal an indicator of a priority or from the terminal an indicator of a new priority when the priority changed, the priority being related to the terminal and indicating whether or not a traffic of the terminal is delay-tolerant. The received priority may be stored in the base station. When the network is not congested, the priority does not need to be used. However, when the network is congested 220, the base station performs radio resource management 230 based on the received priority indicator.

When the network is congested ("yes" in step 220), the radio resource management step 230 may further include the step of removing bearers carrying terminal traffic and/or the corresponding RRC connection 250 when the corresponding received indicators indicate a delay-tolerant priority ("yes" in step 240). Moreover, the radio resource management step 230 may further include the step of deciding 270 in accordance with the congestion status whether to remove 280 or not to remove bearers carrying terminal traffic and/or the corresponding RRC connection when the corresponding received indicators do not indicate a delay-tolerant priority ("no" in step 240).

It is noted that, in general, the status of the congestion may reflect the ratio between the available and the requested resources or any other criteria. FIG. 2 shows in step 270 the decision whether or not the congestion is still serious after the release of the low-priority bearers/terminal connections. When the device priority is available on a per bearer basis, step 260 may be present, according to which when there are still some normal-priority bearer ("yes" in step 260) for a dual-priority device, it is decided in step 270 whether they are to be released or not, depending on the congestion situation after releasing the low-priority bearer, i.e. according to the level of the congestion.

Figure 3:
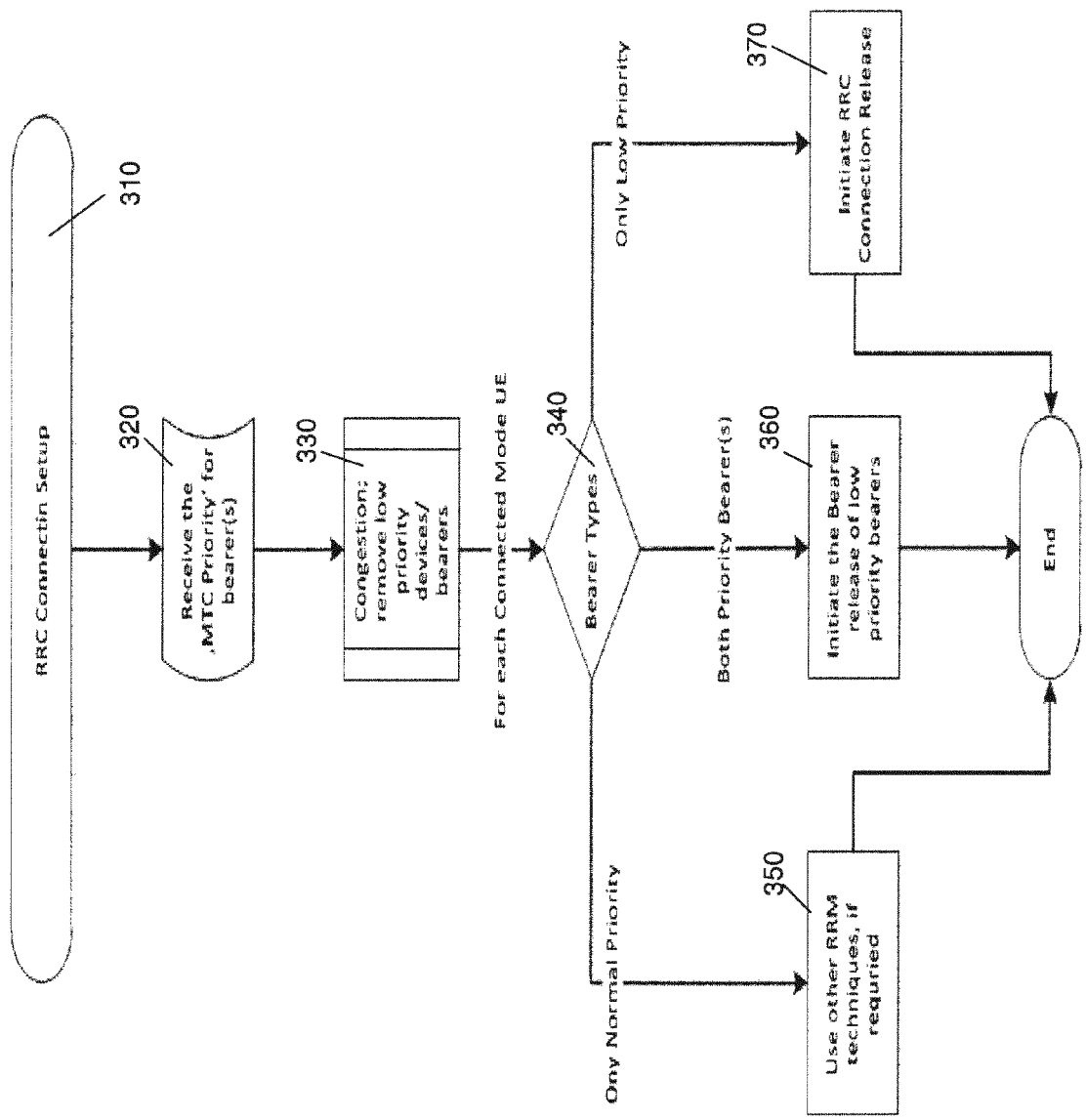
FIG. 3 is a flow diagram illustrating an exemplary handling of a base station in accordance with another embodiment of the present invention.

FIG. 3 shows separately the radio resource management approach applied by the LTE base station for the case when the device priority is provided per bearer. In particular, FIG. 3 shows the UE initial network access by means of RRC Connection Setup procedure 310 (which may also be used to signal change of the device priority as will be described below) including receiving 320 of the device priority ("MTC priority") per bearer. Based on the received device priority when the network is congested, the low-priority bearer of a terminal or a plurality of terminals are released 330. For the devices having only the low-priority bearer this also means releasing of the device connection, i.e. changing the state of the device (terminal) from the CONNECTED to the IDLE state. In particular, the releasing 330 may work as follows. For each UE (device) in the CONNECTED mode, the type of its bearers is evaluated 340. When the UE has only normal priority bearer, other RRM approaches are used 35. When possible, the normal-priority bearer is/are not released. The other RRM approaches may be, for instance releasing the connection with a different cause value so that it can be re-directed to a different system or handing this UE over to another cell/system etc. When the UE has one or more bearer with low priority and one or more bearer with normal priority, only the low-priority bearer are released 360. When the UE has only bearer with low priority, RRC connection release is initiated 370.

Accordingly, the base station "looks" at the bearer's priority and initiate the bearer release of only the low priority bearer, if required when congestion occurs. Thus the RRC connection does not need to be necessarily released. The RRC connection is only released, if the only remaining bearer is a low priority bearer with setting the "extendedWaitTime" in RRC Connection release message, if required when congestion occurs. The setting of the timer has the effect of not allowing the UE to try a connection again within the time indicated by this timer.

The RRC connection is not released, if the only remaining bearer is a normal-priority bearer.

The base station may obtain the information about a device priority or about a change of the device priority from the core network or from the terminal. In the following, the first option, namely transmitting the device priority indicating information from the core network to the base station is described.

Figure 4:
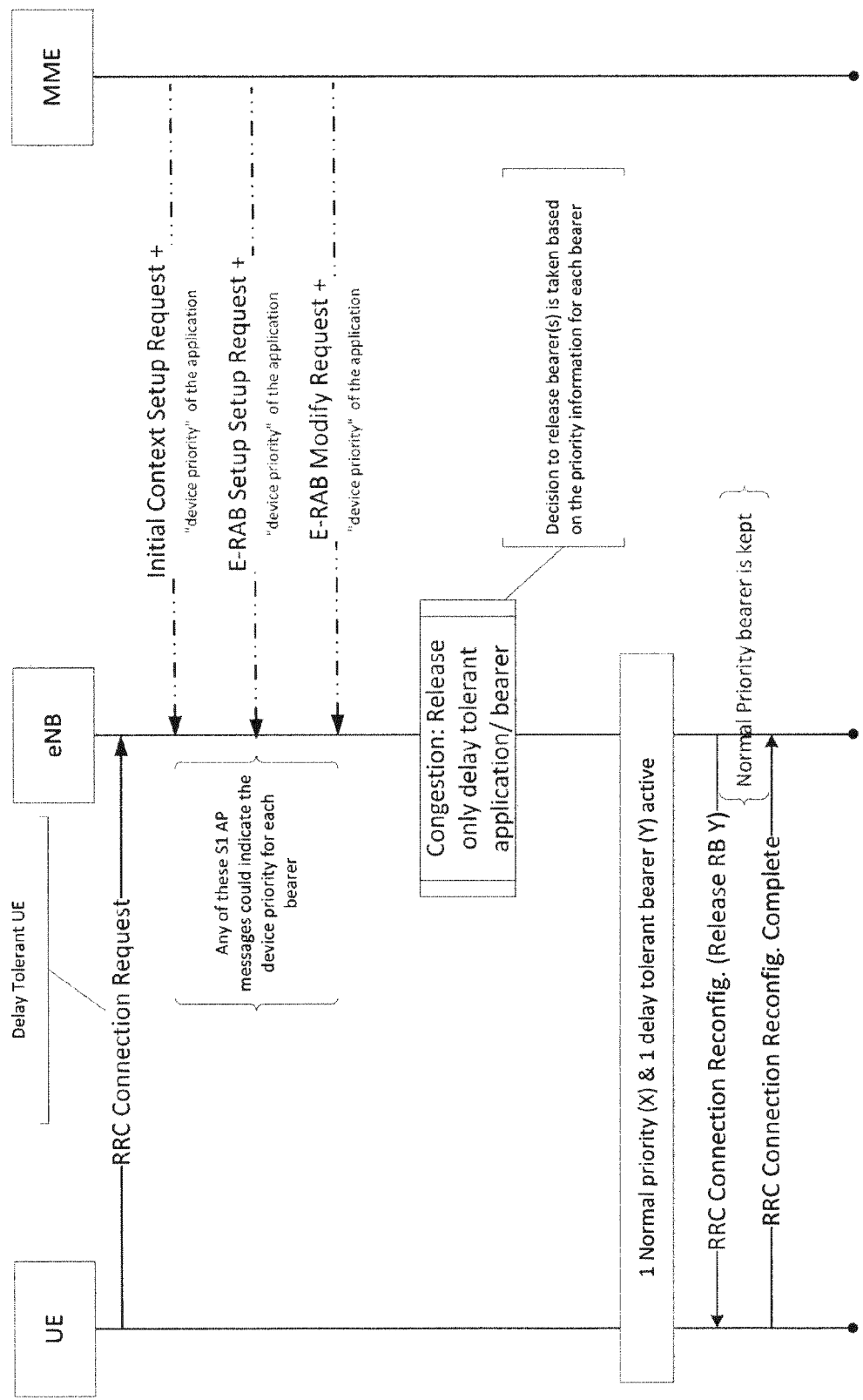
FIG. 4 is a message flow illustrating signaling of the device priority from the MME to the eNB using a new information element in an existing S1-AP message.

FIG. 4 illustrates an embodiment of the present invention in which the MME serving the UE indicates to the eNB the device priority of a new or a modified bearer using a new information element (IE) in an available S1-AP message(s).

In particular the corresponding method for execution in a network node (a node in the core network) such as mobility management node serving the terminal includes the step of determining a priority being related to the terminal and indicating whether or not a traffic of the terminal is delay-tolerant. In the example of FIG. 4, the priority is determined per bearer. The determination may be performed by extracting the priority from the storage and/or by receiving it from the terminal for instance when establishing a new session by using an IE called "Device Property".

The method performed by the network node further includes transmitting to the base station an indicator of the determined priority so as to enable the base station to perform radio resource management tasks including congestion or admission control based on the priority.

The indicator may be included in a message of the S1-AP protocol (defined by 3GPP) from the network node to the base station. S1-AP messages are used in LTE between the MME and the eNB to add or modify or delete UE bearers. For instance, one or more of the following existing messages may be used:

Initial Context Setup Request,
E-RAB Setup Request,
E-RAB Modify Request.

As illustrated in FIG. 4 (cf. "device priority for the application"), each of these NAS messages should advantageously include a new IE that indicates to the eNB what the device priority of the particular bearer is. Upon congestion, the eNB should decide which bearers are delay tolerant and can be removed/released as shown above. For such bearers the eNB may send an RRC Connection Reconfiguration message to the UE to delete the corresponding radio bearers (cf. "Release RB Y"). The same is communicated to the MME by the eNB, if required. In particular, an eNB sends an indication of bearer release to the MME when the eNB releases radio bearers. This indication may be sent over the Bearer Release Request (EPS Bearer Identity) message to the MME, or, alternatively over Initial Context Setup Complete, Handover Request Ack and UE Context Response, Part Switch Request or others. The normal priority bearer (cf. RB "X", bearer "X") remains configured.

Figure 5:
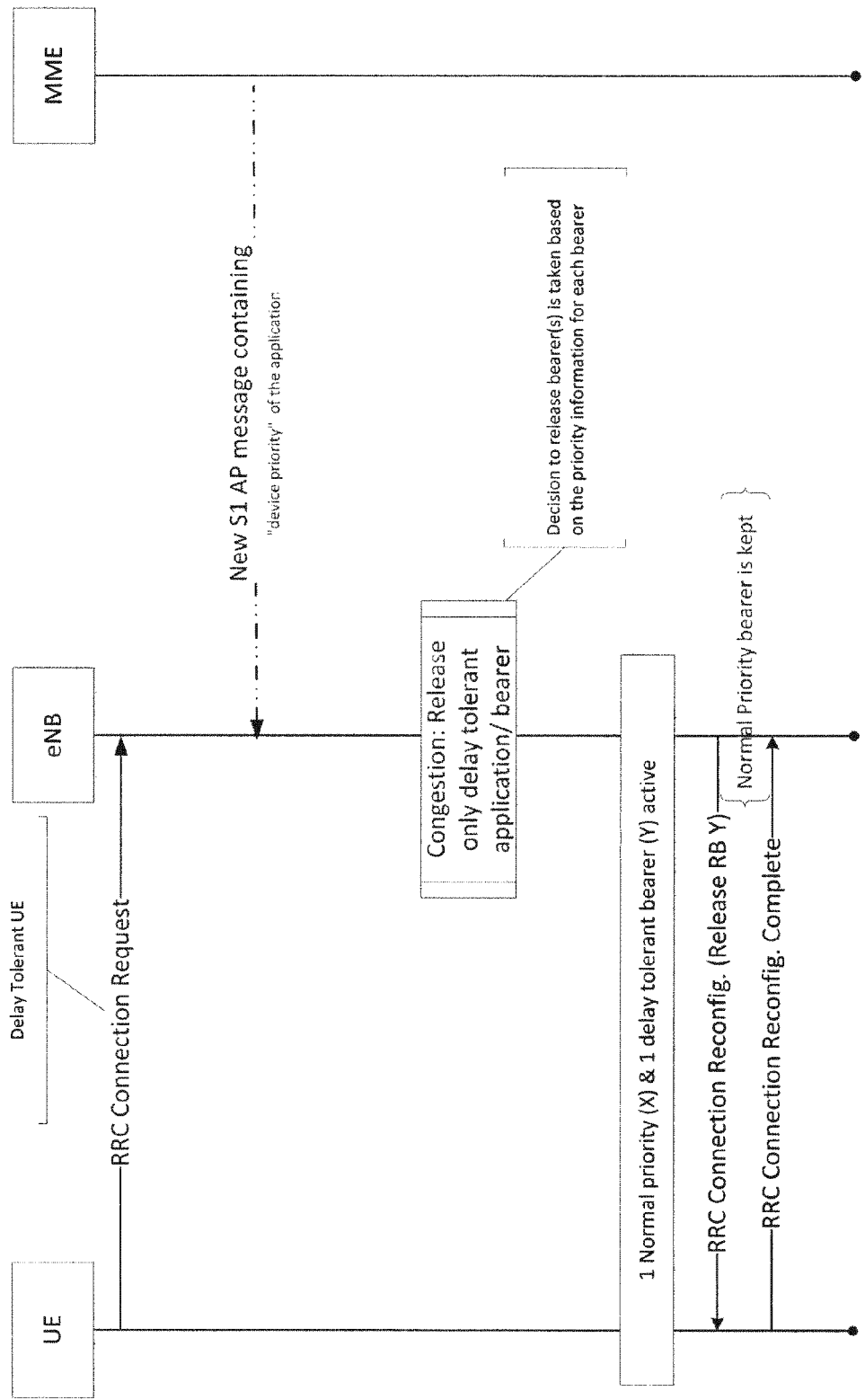
FIG. 5 is a message flow illustrating signaling of the device priority from the MME to the eNB using a new S1-AP message.

FIG. 5 illustrates an exemplary embodiment of the present invention in the device priority per bearer is signaled from the MME to the UE using a new S1-AP message. This means that none of the available (existing) S1-AP is used, but rather a new S1-AP message is defined in the S1-AP protocol. The new message has advantageously an information element for signaling whether each if the configured bearers is a low-priority or a normal-priority bearer. As can be seen, FIG. 5 differs from FIG. 4 in that a new S1-AP message "New S1AP message containing device priority of the application" is transmitted from the MME to the eNB.

Figure 6:
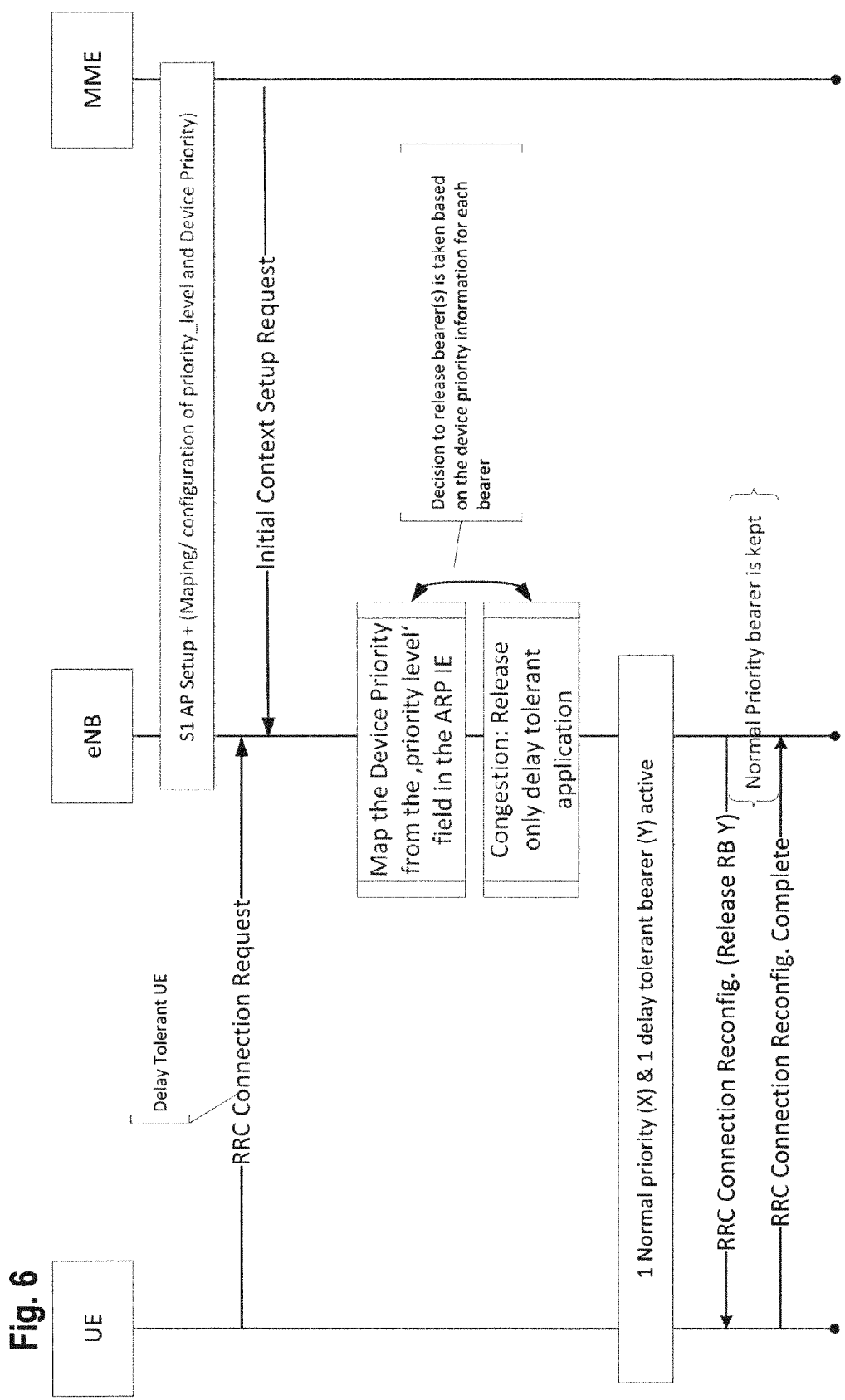
FIG. 6 is a message flow illustrating signaling of the device priority from the MME to the eNB reusing an available information element in an existing S1-AP message.

FIG. 6 shows another embodiments of the present invention according to which the MME indicates to the eNB the device priority of the new or modified bearer by re-using an already available IE in an already available S1-AP message. For instance, the IE may be the allocation and retention priority (ARP).

In this embodiment, thus, the S1-AP message for signalling the device priority indicator includes an information element carrying allocation/retention priority for scheduling purposes, the information element being configured to take a value from a predefined range of values. The values of the priority indicating whether or not a traffic of the terminal is delay-tolerant are mapped to said predefined range of values in such manner that one or more of the values from the predefined range indicate that the terminal traffic is delay-tolerant and another one or more of the values from the predefined range indicate that the terminal traffic is not delay-tolerant. The mapping may be is configured by the base station or the mobility management node serving the terminal.

The base station or the mobility management node serving the terminal may transmit the configured mapping to each other respectively.

As already described above, some information is signaled to the eNB by the MME to indicate the QoS characteristics of the new or the modified bearer(s). This information could be a QoS class identifier (QCI) value or Allocation and Retention Priority (ARP) as specified in Section 9.2.1.60 of 3GPP TS 36.413, v. 10.5.0, *"S1 Application Protocol (S1AP)"*, available freely over www.3gpp.org. ARP is sent to the eNB by MME during a bearer setup and bearer modification.

A first possibility is to use the ARP information element which includes the "Priority Level", "preemption capability", "preemption vulnerability" elements by extending it to carry a new element "MTC priority". ARP is sent to the eNB by MME during a bearer setup and bearer modification. The eNB could conclude from the MTC Priority that the bearer being established is low or a normal priority bearer (or other). For instance, normal-priority access can be identified as access which does not contain any of the existing access indicators, namely "low priority" (delay tolerant). There may also be some "other" default accesses such as "special access class 11-15" or "emergency call", i.e. existing default access, such as the classes for the purpose of access barring in 3GPP TS 22.011, "Service Accessibility". 10.3.0, Section 4.3.1.

The following table illustrates the corresponding modified information element of the ARP with the newly added (shown as underlined) "MTC priority":

| IE/Group Name | Presence | IE type and reference |
|---|---|---|
| Priority Level | M | INTEGER (0 . . . 15) |
| Pre-emption Capability | M | ENUMERATED(shall not trigger pre-emption, may trigger pre-emption) |
| Pre-emption Vulnerability | M | ENUMERATED(not pre-emptable, pre-emptable) |
| MTC Priority | M | ENUMERATED (Low, Normal, Other) |

Another possibility is to reuse the element "Priority Level" in the ARP. For example, the "Priority Level" inside the ARP could be reused to indicate the device priority of the (new/modified) application.

This can be achieved by specifying a new meaning for a subset of values of the already available IE for example, by mapping the existing "Priority Level" values to the new device (MTC) priority, i.e. mapping at least the levels "delay tolerant" or "normal" onto the "priority Level" values.

One possible example can be as follows:
priority level 0 to 5: Low Priority (for instance, MTC device or a bearer performing MTC application),
priority level 6 to 15: Normal Priority (for instance, non-MTC device or a bearer performing normal, non-MTC application).

It is noted that this is only an example and that the assignment of the priority levels can be selected differently. For instance, a priority level of 0 to m, m being an integer from 0 to M−1 (M being the maximum value, in this example M=15) would indicate the low priority and the remaining m+1 to M values would indicate the normal priority. Alternatively, another level(s) of the device priority such as "other" or the specific priority levels corresponding to default access classes can be defined.

The mapping of the device priority to the "Priority Level" IE of the ARP may be predefined in standard. However, it may also be configurable. This can be achieved by configuring between the MME and eNB the new meaning for a subset of values of the already available IE (e.g. priority level in the above example).

This is shown in FIG. 6, in which during the S1 setup the possible mapping between priority level and device priority configuration takes place between the eNB and the MME. This is illustrated by the rectangle "S1 AP setup: mapping/configuration of priority level and the device priority". It is noted that this exchange can take place in the direction from the eNB to the MME (eNB configures the mapping and transmits it to the MME) or vice versa (MME configures the mapping and transmits it to the eNB).

Thereafter, the eNB interprets the priority level values to see if the new or modified application or bearer are delay-tolerant or normal (or possibly, other predetermined level). This is illustrated by the functional box "map the device priority from the priority level filed of the ARP" on the eNB side. In accordance with the interpretation, in case of congestion, low-priority bearer may be released. For such low-priority bearers (in the Figure, the bearer "Y"), the eNB sends the RRC connection reconfiguration to the UE to delete the corresponding radio bearers (RB). The same is informed to the MME by the eNB if required.

In the above description, the device priority has been shown as indicating the device priority per bearer, i.e. per application traffic carried by the bearer. However, the present invention is not limited thereto. In accordance with another embodiment of the present invention, the (priority) indicator indicates a device priority which is the overall priority of the terminal including all configured bearers. Preferably, the overall priority of the terminal is defined as a maximum of the priorities of the terminal's configured bearers (applications being executed).

Figure 7:
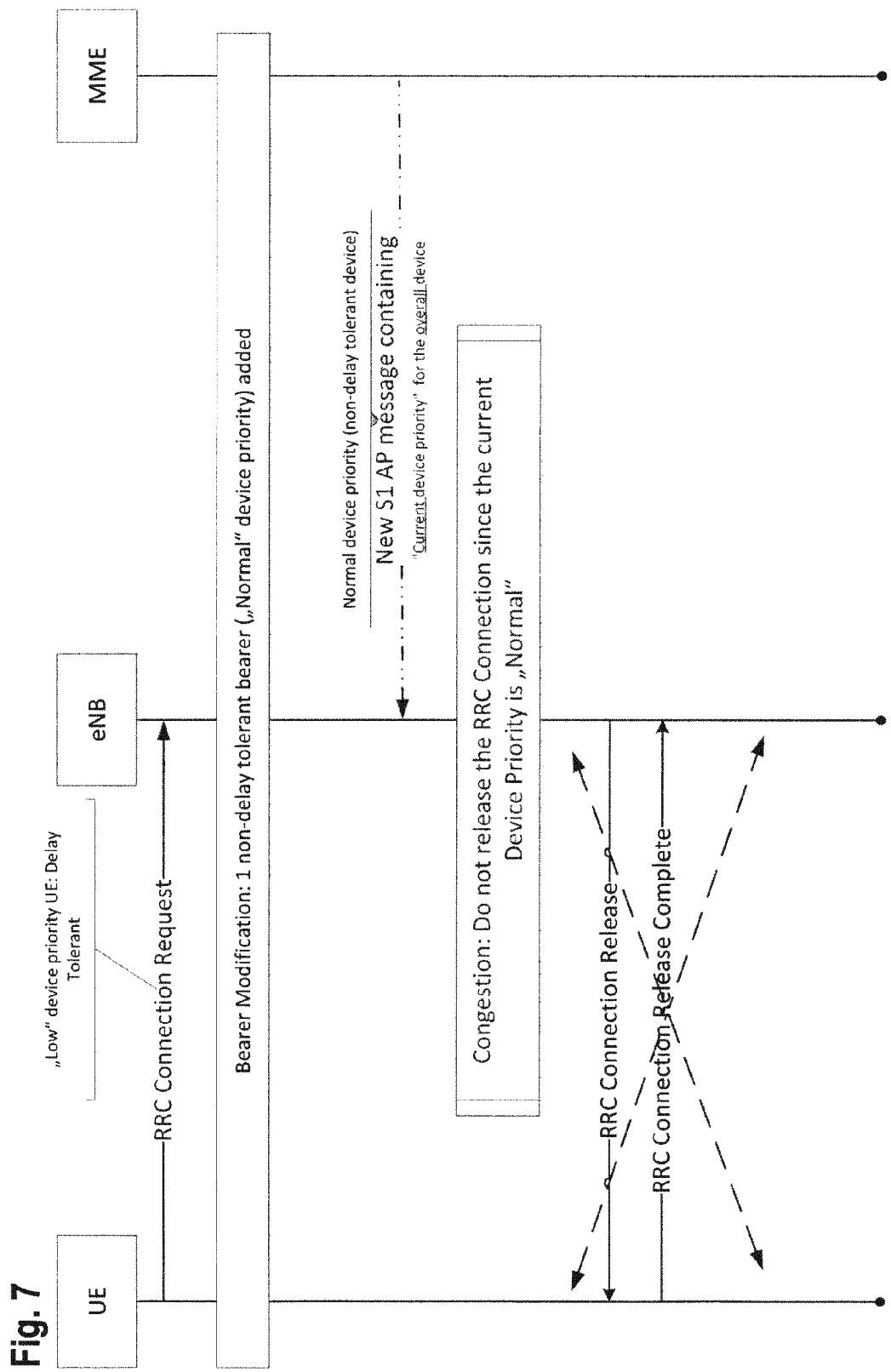
FIG. 7 is a message flow illustrating signaling of the overall device priority from the MME to the eNB.

FIG. 7 illustrates signaling from the MME to the base station of the overall priority.

As part of an alternative, the above indication (about device priority) from MME to eNB is only present when the device priority "per UE" changes. The term "device priority" when applied to an application/bearer indicates whether the application/bearer is delay tolerant or not. If the application/bearer are delay tolerant then it could be removed by the eNB when congestion occurs. Since the application is delay tolerant, it can withstand some delay (in receiving network services) and therefore upon removal, the UE should not initiate a connection request to the network due to such application for a specified amount of time (given, for instance in the LTE RRC specification by "ExtendedAccessBarring timer").

The term "device priority" when applied to the device means the "overall" delay tolerance of the device. If there are more than one application/bearer active, then the "overall" delay tolerance of the device shall equal the delay tolerance of the least delay-tolerant application/bearer. For example, if there are two applications/bearers active in the UE, one of which is delay tolerant and the other not, then the "device priority" when applied to the device would means the "overall" priority (delay tolerance) of the device is "normal".

From this perspective, the "per UE" indication of the device priority refers to the "overall" priority (delay tolerance) of the device. As indicated above, the S1-AP messages should then indicate the (current) priority or a change of the priority using a new or an existing S1-AP message.

Therefore, from the network's perspective the priority is 'per UE'; i.e. the radio network considers the UE as either a low-priority or a normal-priority UE based on the recent information that is available either from the UE (the establishment cause value in RRC connection request or as described below for another embodiment) or from the MME (as described in the embodiments above). The UE indicates the low priority access for mobile-originated (MO) calls in the RRC Connection Establishment message (by setting the 'EstablishmentCause' as 'delayTolerantAccess'); so that the radio network classifies this UE as a low-priority UE; otherwise (with any other 'EstablishmentCause') the UE is considered as normal-priority UE.

This means that the decision to retain or release the UE is taken as whole for the UE's RRC connection, rather than (for example) releasing only the bearers for low priority application.

FIG. 7 illustrates an example of the message flow assuming that the device priority is the overall priority assigned to the terminal rather than to an application/a bearer of the terminal.

This example shows a situation in which the UE accesses the network with a low-priority (delay-tolerant) application. Thus, the UE sends an RRC Connection Request to the eNB with the cause "delay tolerant access". Then the UE adds an application having a normal priority and thus, a bearer modification procedure is started, in which a new normal-priority bearer is added. As described above, in this embodiment, the device priority is assigned to the UE and not to its particular bearers. The MME is informed about the priority of the applications run by the UE. In particular, the UE started as a low-priority UE since it only ran a low-priority application. Then, a normal-priority application has been added, which results in a change of the overall priority of the UE to the normal-priority.

Adopting of the higher (the highest) priority provides the advantage that in the case of congestion the normal application is not shortened resources only because the same terminal also runs a low-priority application.

As can be seen in FIG. 7, the changed—now normal—priority is signaled from the MME to the UE within an S1-AP message. The S1-AP message may be an existing or a new S1-AP message as shown in the above embodiments described with reference to FIGS. 4 to 6. This is exemplified in FIG. 7 by the "new S1 AP message containing current device priority for the overall device". The current device priority in this example is the normal device priority indicating a non-delay-tolerant device (terminal). Accordingly, when the network is congested, the RRC connection is not released and even the low device priority bearer is maintained since in this embodiment the device priority is applicable per UE and in this example the device priority is "normal" since there is at least one application that is delay tolerant. In general for 'n' applications/bearers active at a time, the device priority applicable per UE is "normal" as long as there is at least one application/bearer that is delay tolerant.

It is noted that this is only an example and that there are further exemplary embodiments possible. For instance, the overall device priority may be determined as low in case where there is more than one low-priority application running and at most one normal application, etc. In general, the overall device priority may distinguish more than two levels (normal, low). Accordingly, the distinguishing may be performed based on the number of low-priority applications and the number of normal priority applications running. For instance, the ratio of the low-priority and the high-priority applications running may be used to determine the priority level. In particular, when mapping the device priority onto the existing ARP priority levels, this distinguishing is easily implementable without increasing the signaling overhead.

In the above embodiments, the device priority has been indicated to the base station from the MME. In the following embodiments it is the terminal who informs the base station about the change of the device priority per bearer or per terminal, or about the current priority per bearer.

In accordance with an exemplary embodiment of the present invention, an addition or deletion of application (bearer) triggers the terminal to perform the following procedure described by means of a pseudo-instructions:

```
RECEIVE (new_event);
If (new_event != NULL)
    If (change of priority is allowed from USIM configuration)
        If addition_of_new_application
            If this_app_priority > current_priority
                current_priority = new_app_priority;
                SEND current_priority to eNB;
            Else (release of existing App)
                temp_priority = max(remaining app priority);
                if this_app_priority > temp_priority
                    current_priority = temp_priority;
                    SEND current_priority to eNB;
                }
            }
        } (do nothing if change of priority is not allowed)
}
```

Here, the "current_priority" denotes the device priority that was last signaled to the eNB and the "this_app_priority" denotes priority of the application/bearer in question.

In particular, the "new_event" is a modification or addition of a bearer for a new application. If the device is a double-priority device, i.e. when the change of priority is allowed, when a new application is added with a higher priority than the current priority, then the current priority changes to the higher priority. Otherwise ("else"), i.e. when a bearer/an application is deleted ("release of existing app"), the device priority is determined as the maximum of the priorities of the remaining applications. The determined device priority is then sent to the base station. Thus, the eNB may calculate the new device priority as maximum of the configured (current+ new in case of addition, or remaining in case of deletion) and treats the RRC connection based on the new device priority. Since eNB knows the priority of each bearer separately, it can decide to release the individual bearers (instead of the entire RRC connection), if required—as already described in the above embodiments, in particular those described with reference to FIGS. 2 and 3.

It is noted that the UE, similarly as the MME described in previous embodiments, may also signal either an overall priority, or—alternatively—a device priority per application (per bearer). Accordingly, the UE may indicate the device priority (normal/delay-tolerant) of each new application or bearer to the eNB. The eNB then maps the received device priority to the bearer identifications (IDs) of both radio bearer and the EPS bearer. Radio bearer is the bearer of the radio access network whereas the EPS bearer is the bearer of the core network.

It is further noted that in this document, the term "bearer" is general and refers to data bearer and/or the signaling bearer. Moreover, it refers to radio bearer as well as to the EPS bearer. In particular, the term "bearer" includes the communication means and traffic characteristics necessary for the corresponding application.

The indication of the new device priority may be transmitted by the UE either by reusing an existing message or by specifying a new message. The indication is preferably transmitted using the RRC protocol.

Figure 8:
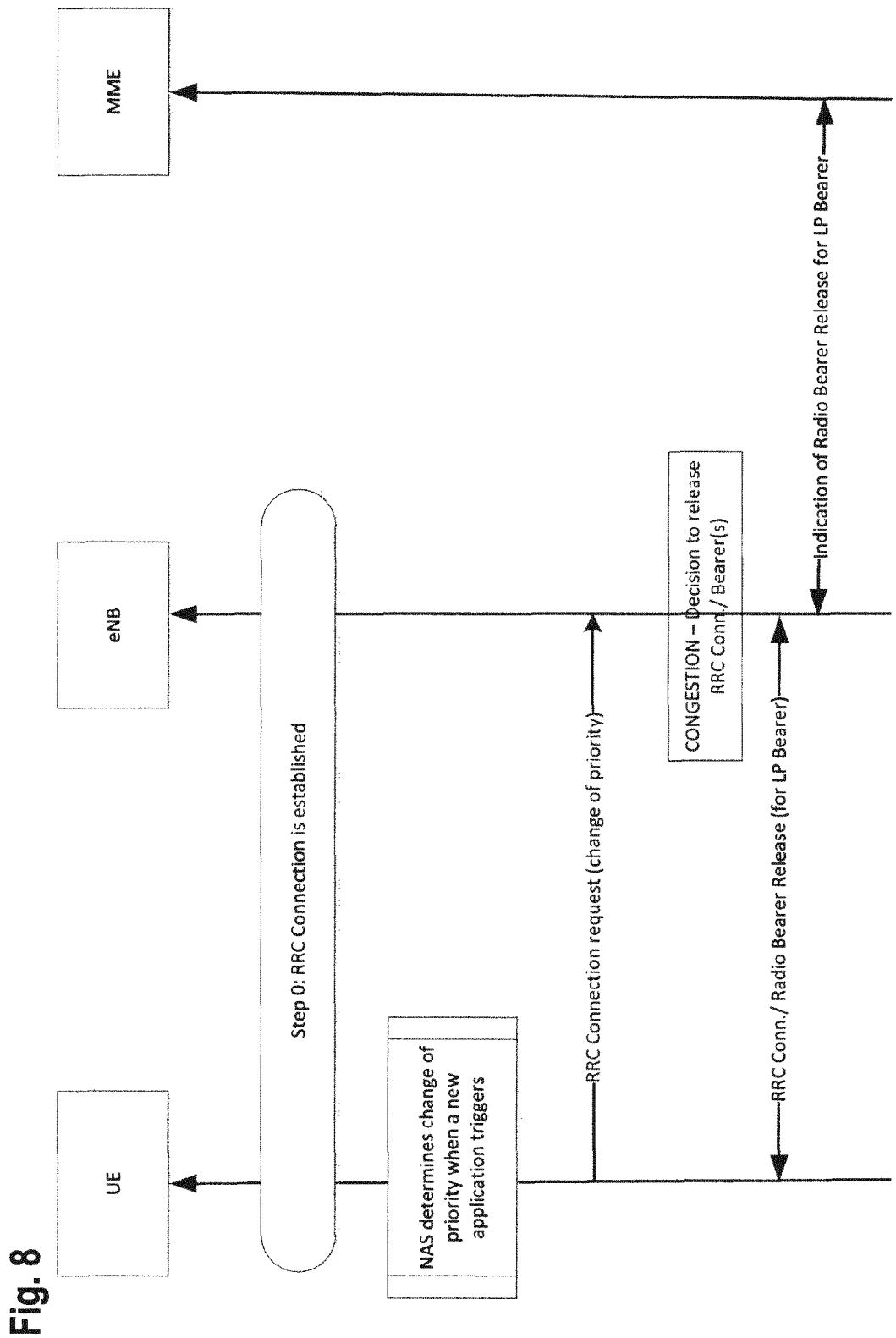
FIG. 8 is a message flow illustrating signaling of the device priority from the terminal to the eNB using an existing RRC connection request message.

FIG. 8 illustrates an example in which the new device priority (new, in the meaning of "changed after the initial access") is included within the RRC Connection request message. After the RRC connection establishment, when the NAS of the terminal detects an event of device priority change, it issues the RRC Connection Request with the cause indicating the new priority. Then, when the eNB is in the state of congestion, it may perform decisions as illustrated in FIGS. 2 and 3 and described above. In particular, the eNB may decide to release the connection by means of "RRC Connection Release" or to release a radio bearer by means of "Radio Bearer Release" for the low-priority (LP) device or radio bearer, respectively. Accordingly, the release of the radio bearer is indicated to the MME.

Figure 9:
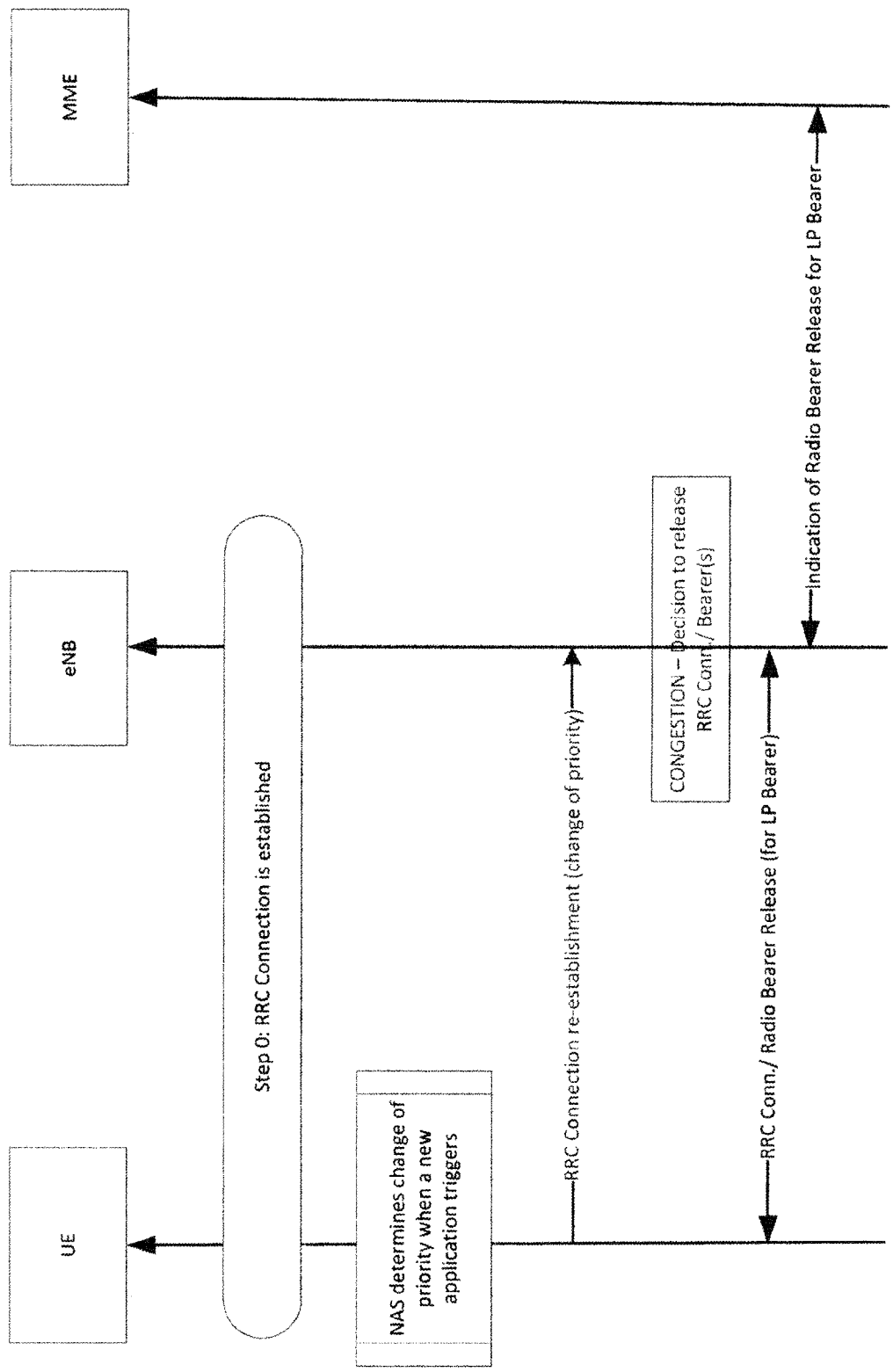
FIG. 9 is a message flow illustrating signaling of the device priority from the terminal to the eNB using an existing RRC connection re-establishment message.

FIG. 9 illustrates another example, which differs from the example of FIG. 8 in that it does not make the use of the RRC Connection Request but rather of the RRC Connection Re-Establishment for signaling the new device priority.

The transmission of the RRC Connection Request or Reestablishment Request is usually connected with a respective Connection Setup procedure and the Connection Reestablishment procedure which, apart from these initial messages include further exchange of messages between the UE and the eNB.

Figure 10:
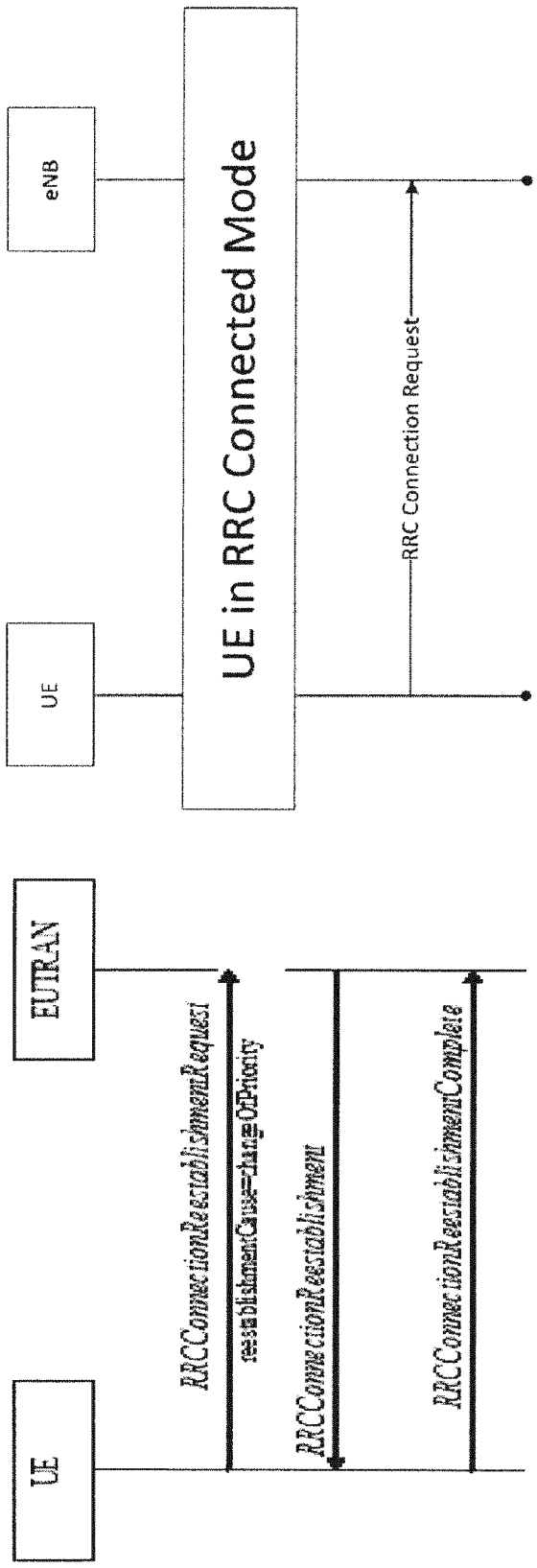
FIG. 10 is a schematic message flow illustrating RRC connection request procedure used usually and used for signaling the device priority.

FIG. 10 illustrates in its left part a typical RRC Connection Reestablishment procedure used for indicating the new priority in accordance with this embodiment. The UE transmits to the eNB a "RRC Connection Reestablishment Request"—for instance here with the cause "change of Priority" in accordance with this embodiment, the eNB responds with the "RRC Connection Reestablishment" instructing the UE to perform the Reestablishment requested and finally, the UE responds with "RRC Connection reestablishment Complete" message to indicate that the reestablishment has been completed.

However, the entire RRC Connection Reestablishment procedure does not necessarily need to be executed. The RLF/T310/T311 phases are not required and the UE need not perform any cell selection. Also the "RRC Connection Reestablishment" message from the eNB and the "RRC Connection Reestablishment Complete" from the UE side are not necessarily required for the purpose of this embodiment. For confirming the reception of the indication of the new priority by the eNB, layer 2 (L2) acknowledgement may be sufficient. Accordingly, the present embodiment may be implemented by the "RRC Connection Reestablishment Request" message only without the following reestablishment procedure steps. This has an advantage of reducing the amount of signaling necessary and shortening the delay of the procedure.

Similarly, the existing RRC connection setup procedure can be trimmed and therefore, can be efficiently used in this embodiment. For example, the corresponding response message from the network is not more necessary for the purpose of the present invention, namely for indicating a new device priority to the eNB. However, the network needs to be able to decide whether to process/discard the reused message, some changes may be introduced to the procedure:

MME sends the DPA (dual-priority application) capability of a UE in, for example, Initial Context Setup request. The eNB maintains a table of DPA capable UE and associates the CRNTI of these UEs. UE sends the RRC Connection request on SRB1 (DCCH) only to change the device priority from delay tolerant to normal or vice versa by setting the establishment cause accordingly. The network (base station) upon receiving an RRC Connection request from a connected-mode UE sees whether the entry is available in the DPA capable table. If yes, it shall process the message and note the MTC priority change based on the "establishment cause". If not, then it should discard the RRC Connection request message.

The UE then sends the RRC Connection Request only in order to change the device priority from delay tolerant to normal or vice versa by setting the establishment cause accordingly. The network (eNB) upon receiving an RRC Connection request from a connected-mode UE shall assume that this was sent to change the device priority which it reconfirms upon seeing the "establishment cause". Accordingly, the network does not send any further message, in particular the RRC Connection Setup or Reestablishment message and also does not expect any further confirmation from the terminal as to the competition of the setup or reestablishment.

Accordingly, the right part of FIG. 10 shows the reduced procedure for indicating the device priority from the connected-mode UE to the eNB by means of the existing "RRC Connection Request". Similarly, the procedure using the "RRC Connection Reestablishment" can be reduced.

Figure 11:
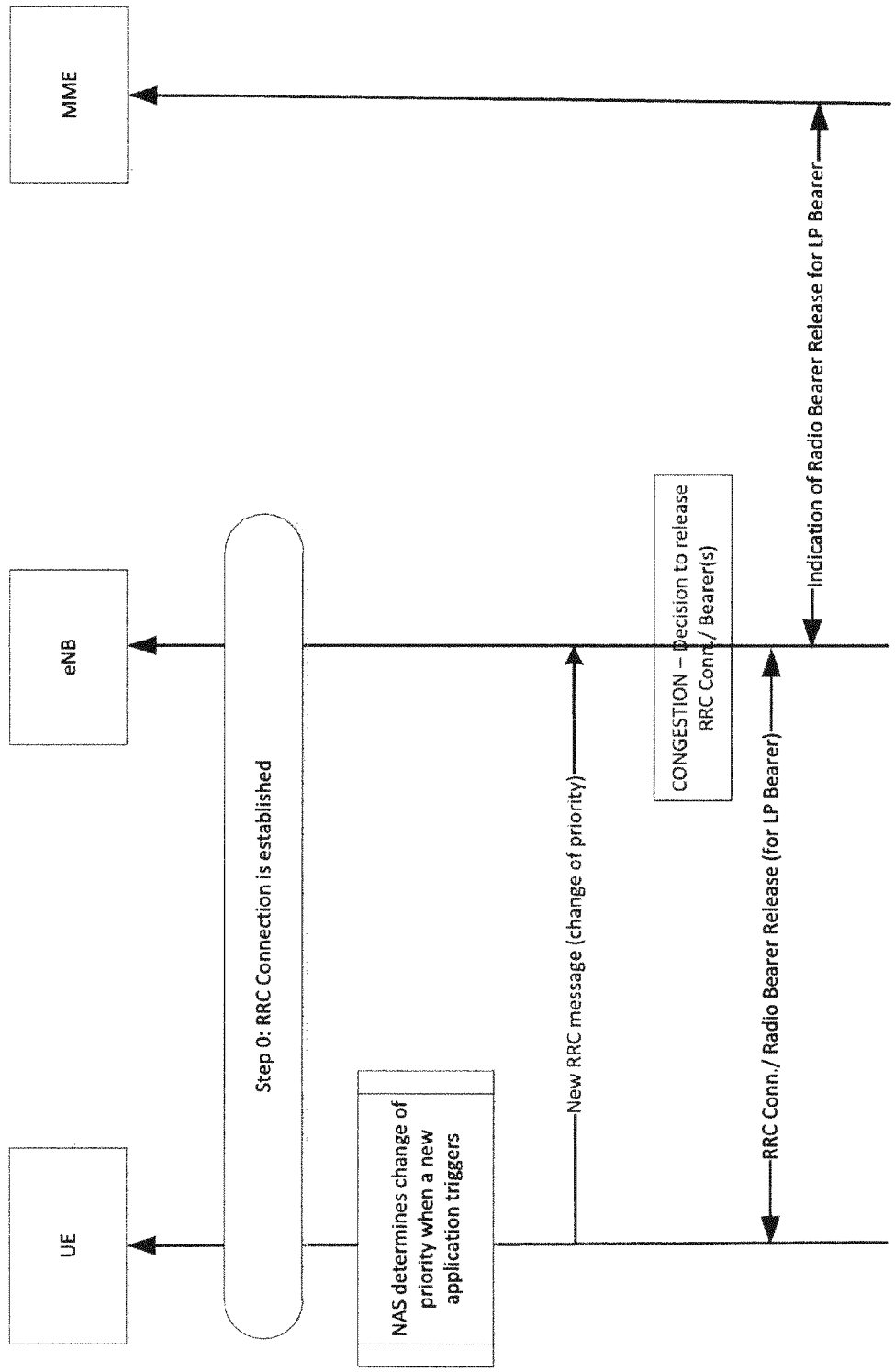
FIG. 11 is a message flow illustrating signaling of the device priority from the terminal to the eNB using a new RRC message.

Another possibility of signaling the device priority indicator is to specify new RRC message for this purpose. FIG. 11 illustrates this approach. FIG. 11 differs from FIGS. 9 and 10 by showing the "New RRC message" indicating the change of the priority rather than reusing an existing RRC message with a different purpose. In this, as well as in previous examples of FIGS. 9 and 10, the device priority may be signaled per application (per bearer) or per terminal, i.e. one for all terminal's bearers.

Figure 12:
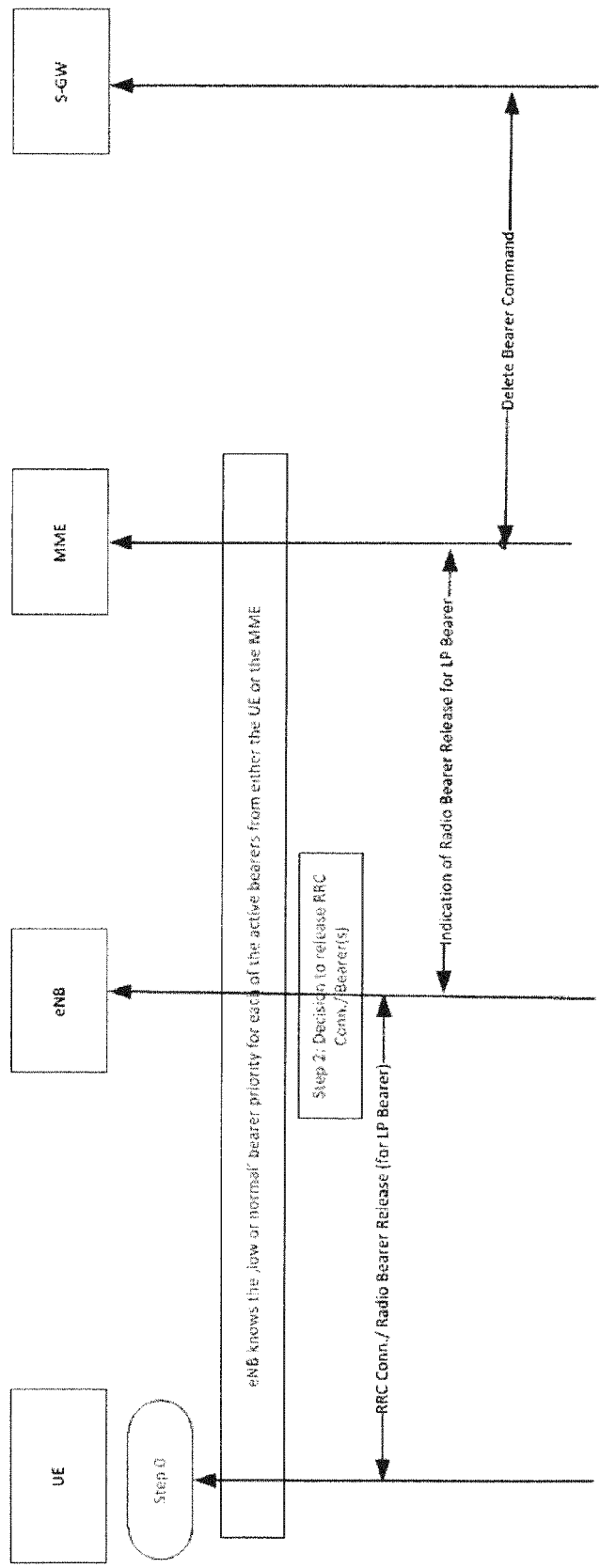
FIG. 12 is a message flow illustrating a generic signaling of the device priority.

FIG. 12 summarizes the overall operation in accordance with an embodiment of the present invention and shows the impact of the procedure on different network nodes. In particular, step 0 performed at the UE side refers to the determination (establishment) of the device priority by the UE, which may be triggered for instance by addition or deletion of an application (a barrier). In accordance with the present invention, the base station is informed about the current or a new priority either from the terminal or from the network node (UE, MME). Accordingly, when the network is congested, step 2 is performed at the base station, as described above, namely, the base station decides to release or to maintain the RRC connection and/or the particular barriers. When the base station decides that the RRC connection or a radio barrier is to be released, the RRC connection release or the RRC radio barrier release procedure is initiated and performed between the UE and the eNB for the low priority barrier decided to be released. Moreover, the release of the radio barrier or the connection is indicated to the network, i.e. to the core network including the MME serving the terminal and the S-GUU.

Figure 13:
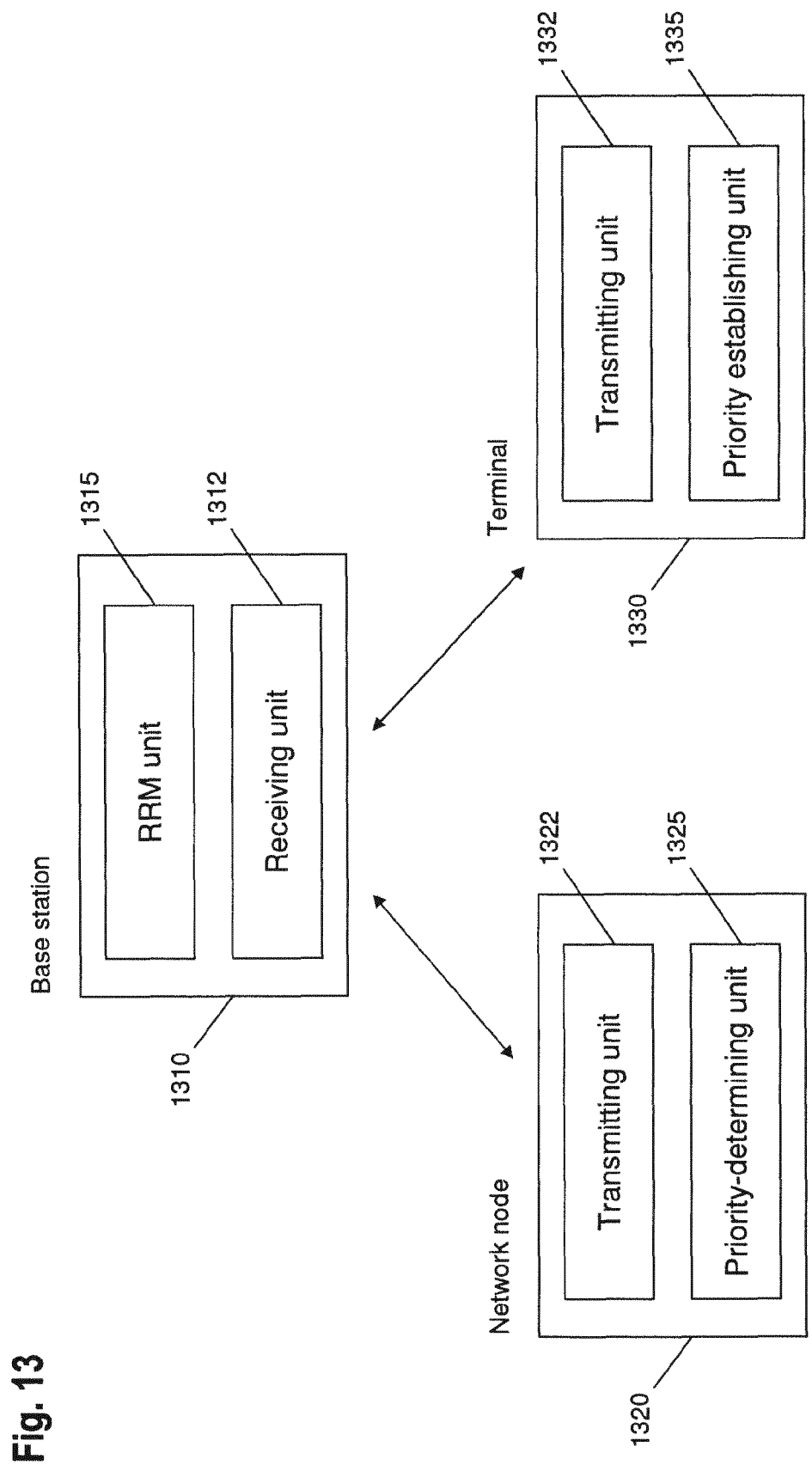
FIG. 13 is a block diagram illustrating the functional structure of a terminal, a base station and a network node.

As can be seen from the above description and figures, the present invention is implemented by the terminal, the base station or a network node. Accordingly, these communication devices have the functional structure shown in FIG. 13. In particular, the base station 1310, in order to be capable of performing radio resource management appropriately, comprises a receiving unit 1312 for receiving an indicator of a device priority which is related to the terminal and indicating whether or not traffic of the terminal is delay tolerant. As discussed above, the traffic of the terminal 1331 may be the traffic of particular barriers for which the corresponding particular device priorities are provided, or it may be the traffic of the entire terminal having one overall device priority. The receiving unit receives the indicator of the current priority from the network node 1320 or receives an indicator of a new priority either from the network node 1320 or from the terminal 1330. The base station further includes a radio resource management unit 1315 for performing the radio resource management tasks including congestion or admission control based on the received indicator. In particular the radio resource management unit may decide to release low priority barriers or release the UE connection when the network is congested. Similarly, the device priority may be utilized for a decision on whether to admit or not to admit a new application (barrier) of the terminal.

A network node such as MME in the LTE which serves the terminal 1330 may include a priority determining unit 1325 for determining a priority related to the terminal and indicating whether or not traffic of the terminal is delay tolerant (i.e. device priority). It may further include a transmitting unit 1322 for transmitting to the base station 1310 an indicator of the determined priority so as to enable the base station 1310 to perform radio resource management tasks based on the indicated priority. The network node 1320, the terminal 1330 and the base station 1310 form a communication system. The terminal communicates over the base station 1310 serving the terminal and over a network node 1320 serving the terminal 1330.

Similarly, a terminal 1330, in accordance with an embodiment of the present invention and capable of being operated in the communication system, comprises a priority determining unit 1335 for establishing a priority related to the terminal and indicating whether or not a traffic of the terminal is delay tolerant. It further includes a transmitting unit 1332 for transmitting an indicator of the priority to the base station so as to enable the base station to perform radio resource management tasks including congestion and admission control based on the indicated priority.

The explanations given in the Technical Background section above are intended to better understand/for a better understanding of the specific exemplary embodiments described herein and should not be understood as limiting the invention to the described specific implementations of processes and functions in the mobile communication network such as a network compliant with the 3GPP standards. Nevertheless, the improvements proposed herein may be readily applied in the architectures/systems described in the Technological Background section and in some embodiments of the invention, they may also make use of standard and improved procedures of theses architectures/systems. It would be appreciated by a person skilled in the art that numerous variations and/or modifications may be made to the present invention as shown in the specific embodiments, without departing from the spirit or scope of the invention as broadly described.

Another embodiment of the invention relates to the implementation of the above described various embodiments using hardware and software. It is recognized that the various embodiments of the invention may be implemented or performed using computing devices (processors). A computing device or processor may, for example, be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also, a combination of software modules and a hardware implementation may be possible. The software modules may be stored on any kind of computer readable storage media, for example RAM, EPROM, EEPROM, flash memory, registers, hard disks, CD-ROM, DVD, etc.

Summarizing, the present invention relates to performing radio resource management tasks in a communication system including at least a base station and a terminal. In order to avoid inconsistencies in executing the radio resource management tasks for the dual-priority devices, which may run a delay-tolerant and a normal application at the same time, when the device priority changes, the change is indicated to the base station either from the terminal or from the core network. The device priority may be indicated as an overall priority per device or as a priority per bearer configured for the device.

The invention claimed is:

1. A method for performing radio resource management in a communications system including a base station and a terminal, the method comprising:
receiving, by the base station, an indicator of a priority from a mobility management node serving the terminal or from the terminal, the priority being related to the terminal and indicating whether a traffic of the terminal is delay-tolerant,
removing, by the base station, at least one of a bearer carrying terminal traffic and a corresponding Radio Resource Control (RRC) connection when the received indicator indicates a delay-tolerant priority, and
deciding, by the base station, in accordance with a congestion status whether to remove at least one of a bearer carrying terminal traffic and a corresponding RRC connection when the received indicator does not indicate the delay-tolerant priority.

2. The method according to claim 1, wherein the congestion status indicates a ratio of available and requested resources.

3. The method according to claim 1, wherein the receiving includes receiving the indicator of the priority in an S1-Application Protocol (S1-AP) message from the mobility management node serving the terminal to the base station.

4. The method according to claim 3, wherein the S1-AP message is at least one of an Initial Context Setup Request, an Enhanced Universal Terrestrial Radio Access Network Radio Access Bearer (E-RAB) Setup Request, and an E-RAB Modify Request.

5. The method according to claim 3, wherein
the S1-AP message includes an information element carrying an allocation or retention priority for scheduling purposes, the information element being configured to take a value from a predefined range of values, and
the values from the predefined range indicate whether a traffic of the terminal is delay-tolerant and the values are mapped to the predefined range of values such that one or more of the values from the predefined range indicate that the terminal traffic is delay-tolerant and one or more of the values from the predefined range indicate that the terminal traffic is not delay-tolerant.

6. The method according to claim 5, wherein
a mapping of the values to the predefined range of values is configured by the base station or the mobility management node serving the terminal, and
the base station or the mobility management node serving the terminal transmits the configured mapping to the mobility management node serving the terminal or to the base station, respectively.

7. The method according to claim 1, wherein the indicator indicates a device priority which is an overall priority of the terminal including all configured bearers, the overall priority of the terminal being a maximum of priorities of the terminal's configured bearers.

8. A base station capable of performing radio resource management in a communications system including the base station and a terminal, the base station comprising:
a receiver which, in operation, receives an indicator of a priority from a mobility management node serving the terminal or from the terminal, the priority being related to the terminal and indicating whether a traffic of the terminal is delay-tolerant, and a radio resource manager which, in operation, removes at least one of a bearer carrying terminal traffic and a corresponding Radio Resource Control (RRC) connection when the received indicator indicates a delay-tolerant priority, and decides in accordance with a congestion status whether to remove at least one of a bearer carrying terminal traffic and a corresponding RRC connection when the received indicator does not indicate the delay-tolerant priority.

9. The base station according to claim 8, wherein the congestion status indicates a ratio of available and requested resources.

10. The base station according to claim 8, wherein the indicator is included in an S1-Application Protocol (S1-AP) message from the mobility management node serving the terminal to the base station.

11. The base station according to claim 10, wherein the S1-AP message is at least one of an Initial Context Setup Request, an Enhanced Universal Terrestrial Radio Access Network Radio Access Bearer (E-RAB) Setup Request, and an E-RAB Modify Request.

12. The base station according to claim 10, wherein
the S1-AP message includes an information element carrying an allocation or retention priority for scheduling purposes, the information element being configured to take a value from a predefined range of values, and
values indicating whether a traffic of the terminal is delay-tolerant are mapped to the predefined range of values such that one or more of the values from the predefined range indicate that the terminal traffic is delay-tolerant and one or more of the values from the predefined range indicate that the terminal traffic is not delay-tolerant.

13. The base station according to claim 12, wherein
a mapping of the values to the predetermined range of values is configured by the base station or the mobility management node serving the terminal, and
the base station or the mobility management node serving the terminal transmits the configured mapping to the mobility management node serving the terminal or to the base station, respectively.

14. The base station according to claim 8, wherein the indicator indicates a device priority which is an overall priority of the terminal including all configured bearers, the overall priority of the terminal being a maximum of priorities of the terminal's configured bearers.

* * * * *